(12) United States Patent
Jackson et al.

(10) Patent No.: US 8,631,040 B2
(45) Date of Patent: Jan. 14, 2014

(54) COMPUTER-IMPLEMENTED SYSTEMS AND METHODS FOR FLEXIBLE DEFINITION OF TIME INTERVALS

(75) Inventors: Wilma Stainback Jackson, Raleigh, NC (US); Michael J. Leonard, Cary, NC (US); Keith Eugene Crowe, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 13/031,828

(22) Filed: Feb. 22, 2011

(65) Prior Publication Data

US 2011/0208701 A1   Aug. 25, 2011

Related U.S. Application Data

(60) Provisional application No. 61/307,104, filed on Feb. 23, 2010.

(51) Int. Cl.
*G06F 7/00* (2006.01)
*G06F 17/30* (2006.01)

(52) U.S. Cl.
USPC .......................................... 707/791

(58) Field of Classification Search
USPC .......................................... 707/791
See application file for complete search history.

(56) References Cited

U.S. PATENT DOCUMENTS

| | | | |
|---|---|---|---|
| 5,461,699 A | 10/1995 | Arbabi et al. | |
| 5,615,109 A | 3/1997 | Eder | |
| 5,870,746 A * | 2/1999 | Knutson et al. | 1/1 |
| 5,918,232 A | 6/1999 | Pouschine et al. | |
| 5,953,707 A | 9/1999 | Huang et al. | |
| 5,991,740 A | 11/1999 | Messer | |
| 5,995,943 A | 11/1999 | Bull et al. | |
| 6,052,481 A | 4/2000 | Grajski et al. | |
| 6,128,624 A | 10/2000 | Papierniak et al. | |
| 6,151,584 A | 11/2000 | Papierniak et al. | |
| 6,169,534 B1 | 1/2001 | Raffel et al. | |
| 6,189,029 B1 | 2/2001 | Fuerst | |
| 6,208,975 B1 | 3/2001 | Bull et al. | |
| 6,216,129 B1 | 4/2001 | Eldering | |

(Continued)

FOREIGN PATENT DOCUMENTS

WO    2005/124718 A2    12/2005

OTHER PUBLICATIONS

D. C. Bradley, G. M. Steil, and R. N. Bergman, "Quantitation of measurement error with Optimal Segments: basis for adaptive time course smoothing," Am J Physiol endocrinol Metab Jun. 1, 1993 264:(6) E902-E911.*

(Continued)

*Primary Examiner* — Wilson Lee
*Assistant Examiner* — Mark E Hershley
(74) *Attorney, Agent, or Firm* — Kilpatrick Townsend & Stockton LLP

(57) ABSTRACT

Systems and methods are provided for segmenting time-series data stored in data segments containing one or more data records. A combined segment error measure is determined based on a proposed combination of two candidate segments. An error cost to merge the two candidate segments is determined based on a difference between the combined segment error measure and a segment error measure of one of the segments. The two candidate segments are combined when the error cost to merge meets a merge threshold to generate a combined segment.

63 Claims, 19 Drawing Sheets

(56) References Cited

U.S. PATENT DOCUMENTS

| | | | |
|---|---|---|---|
| 6,223,173 B1* | 4/2001 | Wakio et al. | 707/703 |
| 6,230,064 B1 | 5/2001 | Nakase et al. | |
| 6,286,005 B1 | 9/2001 | Cannon | |
| 6,308,162 B1 | 10/2001 | Ouimet et al. | |
| 6,317,731 B1 | 11/2001 | Luciano | |
| 6,334,110 B1 | 12/2001 | Walter et al. | |
| 6,356,842 B1 | 3/2002 | Intriligator et al. | |
| 6,397,166 B1 | 5/2002 | Leung et al. | |
| 6,400,853 B1 | 6/2002 | Shiiyama | |
| 6,526,405 B1 | 2/2003 | Mannila et al. | |
| 6,539,392 B1 | 3/2003 | Rebane | |
| 6,542,869 B1 | 4/2003 | Foote | |
| 6,564,190 B1 | 5/2003 | Dubner | |
| 6,591,255 B1 | 7/2003 | Tatum et al. | |
| 6,611,726 B1 | 8/2003 | Crosswhite | |
| 6,640,227 B1 | 10/2003 | Andreev | |
| 6,735,738 B1 | 5/2004 | Kojima | |
| 6,775,646 B1 | 8/2004 | Tufillaro et al. | |
| 6,792,399 B1 | 9/2004 | Phillips et al. | |
| 6,850,871 B1 | 2/2005 | Barford et al. | |
| 6,876,988 B2 | 4/2005 | Helsper et al. | |
| 6,878,891 B1 | 4/2005 | Josten et al. | |
| 6,928,398 B1 | 8/2005 | Fang et al. | |
| 6,978,249 B1 | 12/2005 | Beyer et al. | |
| 7,072,863 B1 | 7/2006 | Phillips et al. | |
| 7,080,026 B2 | 7/2006 | Singh et al. | |
| 7,103,222 B2 | 9/2006 | Peker | |
| 7,130,822 B1 | 10/2006 | Their et al. | |
| 7,171,340 B2 | 1/2007 | Brocklebank | |
| 7,194,434 B2 | 3/2007 | Piccioli | |
| 7,216,088 B1 | 5/2007 | Chappel et al. | |
| 7,222,082 B1 | 5/2007 | Adhikari et al. | |
| 7,236,940 B2 | 6/2007 | Chappel | |
| 7,240,019 B2 | 7/2007 | Delurgio et al. | |
| 7,251,589 B1 | 7/2007 | Crowe et al. | |
| 7,260,550 B1 | 8/2007 | Notani | |
| 7,280,986 B2 | 10/2007 | Goldberg et al. | |
| 7,433,834 B2 | 10/2008 | Joao | |
| 7,523,048 B1 | 4/2009 | Dvorak | |
| 7,530,025 B2 | 5/2009 | Ramarajan et al. | |
| 7,565,417 B2 | 7/2009 | Rowady, Jr. | |
| 7,570,262 B2 | 8/2009 | Landau et al. | |
| 7,610,214 B1 | 10/2009 | Dwarakanath et al. | |
| 7,617,167 B2 | 11/2009 | Griffis et al. | |
| 7,660,734 B1 | 2/2010 | Neal et al. | |
| 7,689,456 B2 | 3/2010 | Schroeder et al. | |
| 7,693,737 B2 | 4/2010 | Their et al. | |
| 7,702,482 B2 | 4/2010 | Graepel et al. | |
| 7,711,734 B2 | 5/2010 | Leonard et al. | |
| 7,716,022 B1 | 5/2010 | Park et al. | |
| 8,005,707 B1 | 8/2011 | Jackson et al. | |
| 8,010,324 B1 | 8/2011 | Crowe et al. | |
| 8,010,404 B1 | 8/2011 | Wu et al. | |
| 8,326,677 B1 | 12/2012 | Fan et al. | |
| 2002/0169657 A1 | 11/2002 | Singh et al. | |
| 2003/0101009 A1 | 5/2003 | Seem | |
| 2003/0105660 A1 | 6/2003 | Walsh et al. | |
| 2003/0110016 A1 | 6/2003 | Stefek et al. | |
| 2003/0154144 A1 | 8/2003 | Pokorny et al. | |
| 2003/0187719 A1 | 10/2003 | Brocklebank | |
| 2003/0200134 A1 | 10/2003 | Leonard et al. | |
| 2003/0212590 A1* | 11/2003 | Klingler | 705/10 |
| 2004/0041727 A1* | 3/2004 | Ishii et al. | 342/109 |
| 2004/0172225 A1 | 9/2004 | Hochberg et al. | |
| 2005/0055275 A1 | 3/2005 | Newman et al. | |
| 2005/0102107 A1 | 5/2005 | Porikli | |
| 2005/0114391 A1* | 5/2005 | Corcoran et al. | 707/103 R |
| 2005/0159997 A1 | 7/2005 | John | |
| 2005/0177351 A1 | 8/2005 | Goldberg et al. | |
| 2005/0209732 A1 | 9/2005 | Audimoolam et al. | |
| 2005/0249412 A1 | 11/2005 | Radhakrishnan et al. | |
| 2005/0271156 A1* | 12/2005 | Nakano | 375/265 |
| 2006/0063156 A1 | 3/2006 | Willman et al. | |
| 2006/0064181 A1 | 3/2006 | Kato | |
| 2006/0085380 A1 | 4/2006 | Cote et al. | |
| 2006/0112028 A1 | 5/2006 | Xiao et al. | |
| 2006/0143081 A1 | 6/2006 | Argaiz | |
| 2006/0241923 A1 | 10/2006 | Xu et al. | |
| 2006/0247900 A1 | 11/2006 | Brocklebank | |
| 2007/0094168 A1 | 4/2007 | Ayala et al. | |
| 2007/0106550 A1 | 5/2007 | Umblijs et al. | |
| 2007/0162301 A1 | 7/2007 | Sussman et al. | |
| 2007/0203783 A1 | 8/2007 | Beltramo | |
| 2007/0208492 A1 | 9/2007 | Downs et al. | |
| 2007/0208608 A1 | 9/2007 | Amerasinghe et al. | |
| 2007/0291958 A1 | 12/2007 | Jehan | |
| 2008/0288537 A1* | 11/2008 | Golovchinsky et al. | 707/104.1 |
| 2008/0294651 A1 | 11/2008 | Masuyama et al. | |
| 2009/0018996 A1 | 1/2009 | Hunt et al. | |
| 2009/0172035 A1* | 7/2009 | Lessing et al. | 707/104.1 |
| 2011/0145223 A1* | 6/2011 | Cormode et al. | 707/722 |

OTHER PUBLICATIONS

Keogh, E.; Chu, S.; Hart, D.; Pazzani, M.; "An online algorithm for segmenting time series," Data Mining, 2001. ICDM 2001, Proceedings IEEE International Conference on , vol., No., pp. 289-296, 2001.*

Palpanas, T.; Vlachos, M.; Keogh, E.; Gunopulos, D.; Truppel, W.; "Online amnesic approximation of streaming time series," Data Engineering, 2004. Proceedings. 20th International Conference on , vol., No., pp. 339-349, Mar. 30-Apr. 2, 2004.*

Wang Xiao-Ye; Wang Zheng-Ou; "A structure-adaptive piece-wise linear segments representation for time series," Information Reuse and Integration, 2004. IRI 2004. Proceedings of the 2004 IEEE International Conference on , vol., No., pp. 433-437, Nov. 8-10, 2004.*

Kalpakis, K.; Gada, D.; Puttagunta, V.; , "Distance measures for effective clustering of ARIMA time-series," Data Mining, 2001. ICDM 2001, Proceedings IEEE International Conference on , vol., No., pp. 273-280, 2001.*

Huang, N. E., Wu, M.-L., Qu, W., Long, S. R. and Shen, S. S. P. (2003), "Applications of Hilbert—Huang transform to non-stationary financial time series analysis." Appl. Stochastic Models Bus. Ind., 19: 245-268.*

Babu, G., "Clustering in non-stationary environments using a clan-based evolutionary approach," Biological Cybernetics, Sep. 7, 1995, Springer Berlin / Heidelberg, pp. 367-374, vol. 73, Issue: 4.*

Atuk, Oguz et al., "Seasonal Adjustment in Economic Time Series," Statistics Department, Discussion Paper No. 2002/1, Central Bank of the Republic of Turkey, Central Bank Review, 15 pp. (2002).

Bruno, Giancarlo et al., "The Choice of Time Intervals in Seasonal Adjustment: Characterization and Tools," Institute for Studies and Economic Analyses, Rome, Italy, 21 pp. (Jul. 2001).

IBM, "IBM Systems, IBM PowerExecutive Installation and User's Guide," Version 2.10, 62 pp. (Aug. 2007).

Bruno, Giancarlo et al., "The Choice of Time Intervals in Seasonal Adjustment: A Heuristic Approach," Institute for Studies and Economic Analysis, Rome Italy, 14 pp. (2004).

Keogh, Eamonn et al., "Segmenting Time Series: A Survey and Novel Approach," Department of Information and Computer Science, University of California, Irvine, California 92697, 15 pp. (2004).

Aiolfi, Marco et al., "Forecast Combinations," CREATES Research Paper 2010-21, School of Economics and Management, Aarhus University, 35 pp. (May 6, 2010).

Automatic Forecasting Systems Inc., Autobox 5.0 for Windows User's Guide, 82 pp. (1999).

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Costantini, Mauro et al., "Forecast Combination Based on Multiple Encompassing Tests in a Macroeconomic DSGE System," Reihe Okonomie/ Economics Series 251, 24 pp. (May 2010).

Crowe, Keith E. et al., U.S. Appl. No. 11/431,089, filed May 9, 2006 entitled "Computer-Implemented System and Method For Generating Forecasts".

(56) References Cited

OTHER PUBLICATIONS

Crowe, Keith E. et al., U.S. Appl. No. 11/431,123, filed May 9, 2006 entitled "Computer-Implemented Systems and Methods For Storing Data Analysis Models".

Data Mining Group, available at http://www.dmg.org, printed May 9, 2005, 3 pp.

Funnel Web, Web site Analysis. Report, Funnel Web Demonstration, Authenticated Users History, http://www.quest.com/funnel.sub.--web/analyzer/sample/UserHist.html (1 pg.), Mar. 2002.

Funnel Web, Web site Analysis Report, Funnel Web Demonstration, Clients History, http://www/quest.com/funnel.sub.--web/analyzer/sample.ClientHist- .html (2 pp.), Mar. 2002.

Garavaglia, Susan et al., "A Smart Guide to Dummy Variables: Four Applications and a Macro," accessed from: http://web.archive.org/web/20040728083413/http://www.ats.ucla.edu/stat/sa- s/library/nesug98/p046.pdf, (2004).

Guerard John B. Jr., Automatic Time Series Modeling, Intervention Analysis, and Effective Forecasting. (1989) Journal of Statistical Computation and Simulation, 1563-5163, vol. 34, Issue 1, pp. 43-49.

Guralnik, V. and Srivastava, J., Event Detection from Time Series Data (1999), Proceedings of the 5th ACM SIGKDD International Conference on Knowledge Discovery and Data Mining, pp. 33-42.

Harrison, H.C. et al., "An Intelligent Business Forecasting System", ACM Annual Computer Science Conference, pp. 229-236 (1993).

Harvey, Andrew, "Forecasting with Unobserved Components Time Series Models," Faculty of Economics, University of Cambridge, Prepared for Handbook of Economic Forecasting, pp. 1-89 (Jul. 2004).

Jackson, Wilma S. et al., U.S. Appl. No. 11/431,127, filed May 9, 2006 entitled "Computer-Implemented Systems and Methods for Defining Events".

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Keogh, Eamonn J. et al., "Derivative Dynamic Time Warping", In First SIAM International Conference on Data Mining (SDM'2001), Chicago, USA, pp. 1-11 (2001).

Kobbacy, Khairy A.H., et al., Abstract, "Towards the development of an intelligent inventory management system," Integrated Manufacturing Systems, vol. 10, Issue 6, (1999) 11 pp.

Kumar, Mahesh, "Combining Forecasts Using Clustering", Rutcor Research Report 40-2005, cover page and pp. 1-16 (Dec. 2005).

Leonard, Michael et al., "Mining Transactional and Time Series Data", abstract and presentation, International Symposium of Forecasting, 23 pp. (2003).

Leonard, Michael et al., "Mining Transactional and Time Series Data", abstract, presentation and paper, SUGI, 142 pp. (Apr. 10-13, 2005).

Leonard, Michael James, U.S. Appl. No. 11/696,951, filed Apr. 5, 2007 entitled "Systems and Methods For Mining Transactional and Times Series Data".

Leonard, Michael, "Large-Scale Automatic Forecasting Using Inputs and Calendar Events", abstract and presentation, International Symposium on Forecasting Conference, 56 pp. (Jul. 4-7, 2004).

Leonard, Michael, "Large-Scale Automatic Forecasting Using Inputs and Calendar Events", White Paper, pp. 1-27 (2005).

Leonard, Michael, "Large-Scale Automatic Forecasting: Millions of Forecasts", abstract and presentation, International Symposium of Forecasting, 156 pp. (2002).

Leonard, Michael, "Predictive Modeling Markup Language for Time Series Models", abstract and presentation, International Symposium on Forecasting Conference, 35 pp. (Jul. 4-7, 2004).

Leonard, Michael, "Promotional Analysis and Forecasting for Demand Planning: A Practical Time Series Approach", with exhibits 1 and 2, SAS Institute Inc., Cary, North Carolina, 50 pp. (2000).

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 40 pp. (1998).

Oates, Tim et al., "Clustering Time Series with Hidden Markov Models and Dynamic Time Warping", Computer Science Department, LGRC University of Massachusetts, In Proceedings of the IJCAI-99, 5 pp. (1999).

Park, Kwan Hee, Abstract "Development and evaluation of a prototype expert system for forecasting models", Mississippi State University, 1990, 1 pg.

Park, Youngjin et al., U.S. Appl. No. 11/431,116, filed May 9, 2006 entitled "Computer-Implemented Systems and Methods For Processing Time Series Data".

Product Brochure, Forecast PRO, 2000, 12 pp.

Quest Software, "Funnel Web Analyzer: Analyzing the Way Visitors Interact with Your Web Site", http://www.quest.com/funnel.sub.--web/analyzer (2 pp.), Mar. 2002.

Safavi, Alex "Choosing the right forecasting software and system." The Journal of Business Forecasting Methods & Systems 19.3 (2000): 6-10. ABI/INFORM Global, ProQuest.

SAS Institute Inc., SAS/ETS User's Guide, Version 8, Cary NC; SAS Institute Inc., (1999) 1543 pages.

Seasonal Dummy Variables, Mar. 2004, http://shazam.econ.ubc.ca/intro/dumseas.htm, Accessed from: http://web.archive.org/web/20040321055948/http://shazam.econ.ubc.ca/intro- /dumseas.htm.

Simoncelli, Eero, "Least Squares Optimization," Center for Neural Science, and Courant Institute of Mathematical Sciences, pp. 1-8 (Mar. 9, 2005).

Tashman, Leonard J. et al., Abstract "Automatic Forecasting Software: A Survey and Evaluation", International Journal of Forecasting, vol. 7, Issue 2, Aug. 1991, 1 pg.

Using Predictor Variables, (1999) SAS OnlineDoc: Version 8, pp. 1325-1349, Accessed from: http://www.okstate.edu/sas/v8/saspdf/ets/chap27.pdf.

van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).

Vanderplaats, Garret N., "Numerical Optimization Techniques for Engineering Design", Vanderplaats Research & Development (publisher), Third Edition, 18 pp. (1999).

Wang, Liang et al., "An Expert System for Forecasting Model Selection", IEEE, pp. 704-709 (1992).

Weiss, Jack, "Lecture 16—Wednesday, Feb. 8, 2006," http://www.unc.edu/courses/2006spring/ecol/145/00l/docs/lectures/lecture16. htm, 9 pp. (Feb. 9, 2006).

Yu, Lean et al., "Time Series Forecasting with Multiple Candidate Models: Selecting or Combining?" Journal of System Science and Complexity, vol. 18, No. 1, pp. 1-18 (Jan. 2005).

Non-Final Office Action of Oct. 31, 2007 for U.S. Appl. No. 10/402,849, 14 pages.

Final Office Action of May 21, 2008 for U.S. Appl. No. 10/402,849, 19 pages.

Non-Final Office Action of Feb. 20, 2009 for U.S. Appl. No. 10/402,849, 21 pages.

Final Office Action of Jul. 1, 2010 for U.S. Appl. No. 10/402,849, 24 pages.

Non-Final Office Action of Aug. 30, 2013 for U.S. Appl. No. 10/402,849, 29 pages.

Non-Final Office Action of Oct. 25, 2013 for U.S. Appl. No. 13/189,131, 37 pages.

\* cited by examiner

USER DEFINITION OF CUSTOM INTERVALS

GENERATION OF INDEXED (DISCRETE) TIME SERIES FROM TIMESTAMPED DATA USING CUSTOM INTERVALS

MEASURING DISCRETE DISTANCES IN TIMESTAMPED DATA USING CUSTOM INTERVALS

MOVING FORWARD AND BACKWARD IN TIME USING CUSTOM INTERVALS

EVALUATING SEASONALITY USING CUSTOM INTERVALS

COMPUTER-IMPLEMENTED SYSTEMS AND METHODS FOR FLEXIBLE DEFINITION OF TIME INTERVALS

CROSS-REFERENCE TO RELATED APPLICATIONS

This application claims priority to U.S. Provisional Patent Application No. 61/307,104, filed Feb. 23, 2010, entitled "Computer-Implemented Systems and Methods for Flexible Definition of Time Intervals." The entirety of which is herein incorporated by reference.

FIELD

The technology described herein relates generally to data forecasting and more specifically to the determination of desirable time periods for use in data forecasting.

BACKGROUND

Historically, time series data is considered as being continuous over time. The underlying assumption is that a smooth, continuous series exists, that this series is being sampled at regular intervals, and that the sampling error is uniform due to the sampling intervals being evenly spaced. These assumptions fit well with data such as the U.S. Gross National Product, national unemployment data, national housing starts, and other smooth aggregate series. If such data is aggregated to a quarterly series, then a smooth seasonal and trend model is apparent.

With the advent of modern computing systems, vast quantities of data are collected in real time. This data is often detailed data such as the sales volume of individual items identified by their unique UPC code. Much of this retail data is seasonal. Consumers buy sweaters in the fall and shorts in the spring. Even when data is aggregated, it can display a seasonal pattern characterized by large periods of inactivity. When an evenly spaced interval is chosen that shows detail in the active period, large numbers of zeros appear in the inactive period.

SUMMARY

Systems and methods are provided for generating a future sales forecast for a future time period in a system where at least one converted time period is of irregular length with respect to other time periods. Past input sales data is received comprising aggregate sales values representing a volume of sales for an input sales period where all input time periods are of uniform length. The input sales data is converted into converted time period data by assigning a sum of sales from a plurality of input time periods into a single converted time period. A predictive data model is generated based on the converted time period data, and a future sales forecast is generated for a future time period based on the predictive data model.

As another example, a computer-implemented method of generating a future sales forecast for a future time period in a seasonal system is provided where the seasonal system has time measured according to a cycle time period, where the cycle time period comprises a plurality of seasonal time periods, where the future sales forecast is generated based on prior sales data from a plurality of past seasonal time periods spanning a plurality of cycle time periods, where at least one of the seasonal time periods is of irregular length with respect to the other seasonal time periods, and where at least one of the seasonal time periods is considered a negligible time period that is assumed to have zero sales during every cycle. The method may include receiving seasonal time period definition data that delineates the cycle time period into the plurality of seasonal time periods, receiving identification of at least one seasonal time period to be identified as a negligible time period that is assumed to have zero sales during every cycle, and receiving input past sales data and storing the input sales data in a computer readable memory, the input sales data comprising a plurality of aggregate sales values, each aggregate sales value representing a volume of sales for an input time period, where all input time periods are of uniform length, and where all input time periods are equal to or shorter than a shortest seasonal time period. The input past sales data may be converted into seasonal time period data, the converting comprising assigning a sum of sales from a plurality of input time periods to a single seasonal time period and assigning zero sales to the negligible time period. A predictive data model may be generated based on the seasonal time period data using a data processor, a future sales forecast may be generated for a future time period based on the predictive data model using the data processor, and the future sales forecast may be stored in the computer readable memory.

The method may further comprise purchasing inventory for a future time period based on the future sales forecast for the future time period. The generated predictive model may be generated using a regression analysis. The seasonal time period definition data may be stored in a conversion data table that stores a plurality of records, each record having a season identifier index and a season begin date, a season begin time, a season end date, or a season end time. The time period definition data may be user supplied. The uniform length may be a length of time selected from the group comprising: second, minute, half-hour, hour, day, week, bi-week, month, quarter, half-year, year, bi-year, decade, quarter-century, half-century, and century. The time period of irregular length may not be a length of time from the group comprising: second, minute, half-hour, hour, day, week, bi-week, month, quarter, half-year, year, bi-year, decade, quarter-century, half-century, and century.

As a further example, a computer-implemented system for generating a future sales forecast for a future time period is provided in a system where at least one converted time period is of irregular length with respect to other time periods. The system may include a data processor and a computer-readable memory encoded with instructions for commanding the data processor to execute steps. The steps may include receiving past input sales data comprising aggregate sales values representing a volume of sales for an input sales period where all input time periods are of uniform length, converting the input sales data into converted time period data by assigning a sum of sales from a plurality of input time periods into a single converted time period, generating a predictive data model based on the converted time period data, and generating a future sales forecast for a future time period based on the predictive data model.

As another example, a computer-implemented method segmenting time series data stored in data segments containing one or more data records may include determining a combined segment error measure based on a proposed combination of two candidate segments. An error cost to merge the two candidate segments may be determined based on a difference between the combined segment error measure and a segment error measure of one of the segments. The two candidate segments may be combined when the error cost to merge meets a merge threshold to generate a combined segment.

DETAILED DESCRIPTION

Figure 1:
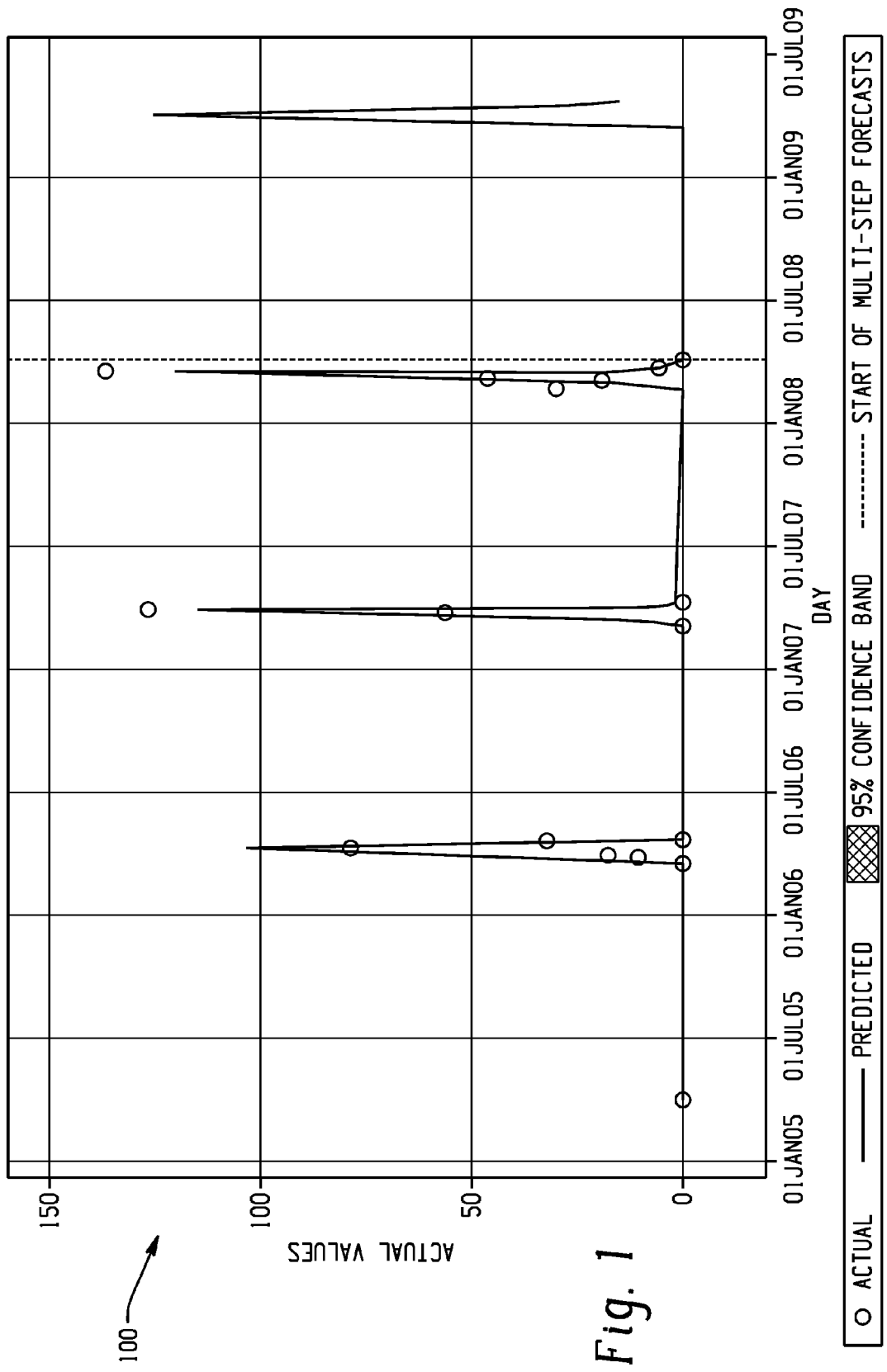
FIG. 1 is a graph depicting actual versus predicted sales for the five weeks of the Easter season for 2006, 2007, and 2008 and a further forecast for Easter 2009.

The following is an example of a forecast using custom intervals. This example provides a forecast of an item sold 3 weeks before Easter, the week of Easter, and one week after Easter. Other weeks of the year, the item is not sold. Using custom intervals, the 5 active weeks can be defined, and one large inactive season can also be defined. The active weeks can then be more accurately forecast, and the forecasts for the inactive weeks can be trivially forecast as zero. This is an example of a highly seasonal item with an inactive season and an active season that moves in time since Easter does not occur on the same day each year. FIG. 1 is a graph depicting actual versus predicted sales for the five weeks of the Easter season for 2006, 2007, and 2008 and a further forecast for Easter 2009 using custom time intervals.

Time intervals are used in date and time calculations when interval lengths are required, increments must be computed, for seasonal computations, and so forth. Irregular time period modeling systems ("systems") may provide predefined intervals for common date and time units such as month, day, weekday, quarter. However, users may find a list of predefined intervals insufficient due to calendar, or other, issues. Problems may arise with holidays, or with repeating schedules like 'two days on, one day off.'

Figure 2:
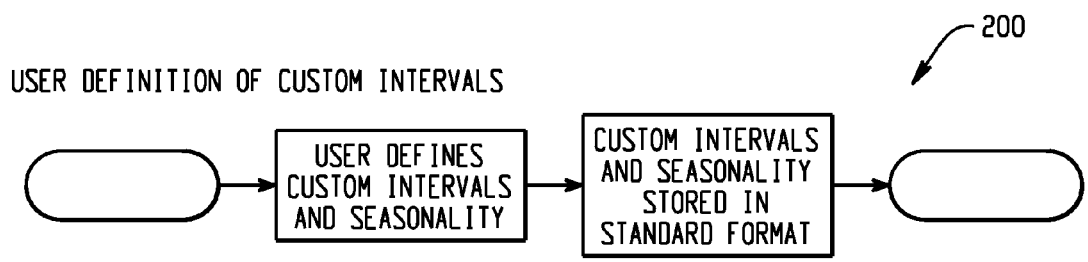
FIG. 2 depicts calculations involving dates that may be performed using custom intervals.
Figure 2:
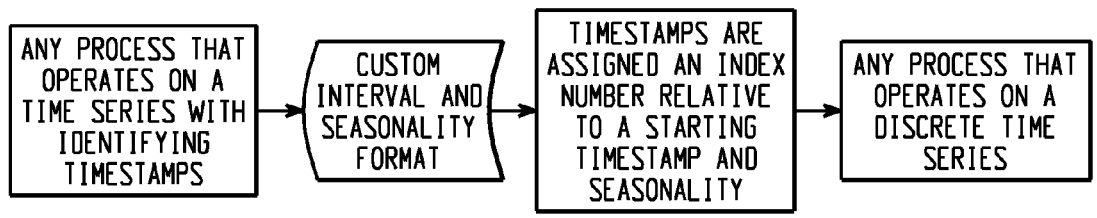
Figure 2:
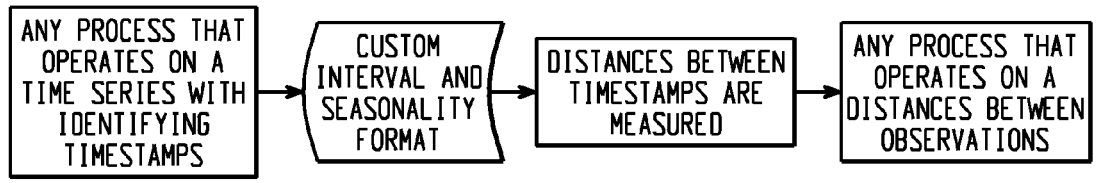
Figure 2:
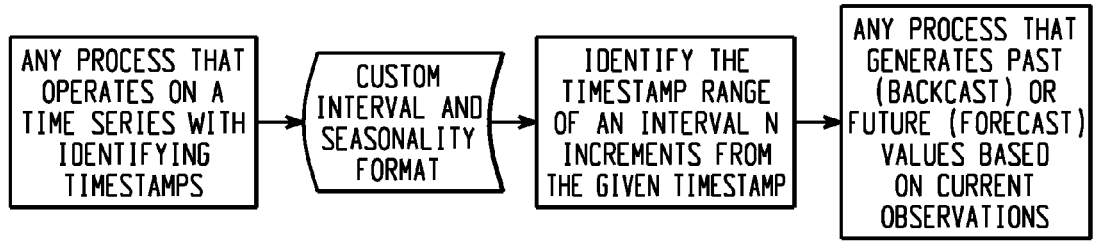
Figure 2:
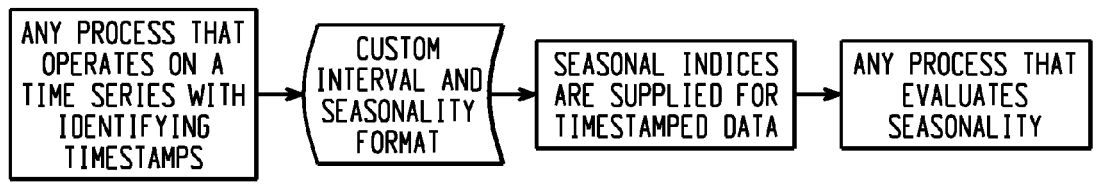

A system may include computations involving dates and time. Algorithms may typically involve calculations such as: what will be the date six weeks from today?; or how many weekdays are between two particular dates? FIG. 2 depicts calculations involving dates that may be performed using custom intervals. These calculations may utilize the definition of a 'unit' of time. Common units include 'day', 'weekday', and 'month.' A system may provide functions to make these calculations, as described further herein, and may also include a large collection of predefined units. In systems, the units may be termed 'time intervals,' or simply 'intervals.'

The list of standard predefined intervals provided by a system may be insufficient for many business problems. A predefined interval is fixed in advance and cannot easily accommodate local customization. For example, if the number of bank business days must be determined between two dates, 'weekday' is a reasonable interval to choose. Between Jul. 1, 2008 and Jul. 31, 2008 there are 23 weekdays. In the United States, however, July 4th is a bank holiday, so the number of business days is 22. In Canada, July 4th is not a bank holiday, so the answer may be 23 in Canada. Thus, the 'weekday' interval may provide a first approximation that requires additional, potentially complex, interval-dependent post-processing.

An irregular time period data modeler system provides a way of specifying a new and completely customized interval. The new interval system may be configured to work in a similar manner as predefined intervals. Based on the prior example, two custom intervals could be created by a user named WEEKDAYUS and WEEKDAYCAN. Then, using an INTCK function (described in further detail herein below) to return number of intervals between dates, INTCK('WEEKDAY', '01JUL08'd, '31JUL08'd) returns 23, INTCK('WEEKDAYUS', '01JUL08'd, '31JUL08' d) returns 22, and INTCK('WEEKDAYCAN', '01JUL08'd, '31JUL08'd) returns 23.

An example problem involves a daily time interval where weekends and certain holidays must be omitted. A custom interval is defined by a data set. Consider a table with two variables BEGIN and END. Each observation in the data set represents one interval with the BEGIN variable containing the start of the interval and the END variable containing the end of the interval. The intervals must be listed in ascending order and there must be no overlaps between intervals.

Consider the month of January 2008, for reference. The following example shows how the first half of January, 2008, would be defined to produce an interval which specifies a daily interval with weekend days included in the preceding week day (i.e., Saturday and Sunday are grouped in a single time period with Friday).

| BEGIN | END |
| --- | --- |
| '01jan2008'd | '01jan2008'd |
| '02jan2008'd | '02jan2008'd |
| '03jan2008'd | '03jan2008'd |
| '04jan2008'd | '06jan2008'd |
| '07jan2008'd | '07jan2008'd |
| '08jan2008'd | '08jan2008'd |
| '09jan2008'd | '09jan2008'd |
| '10jan2008'd | '10jan2008'd |
| '11jan2008'd | '13jan2008'd |
| '14jan2008'd | '14jan2008'd |
| '15jan2008'd | '15jan2008'd |

Now suppose Jan. 10, 2008, should be treated as a holiday so that incrementing one interval from Jan. 9, 2008, should return Jan. 11, 2008. This is accomplished by replacing the two observations

| | |
|---|---|
| '09jan2008'd | '09jan2008'd |
| '10jan2008'd | '10jan2008'd | with

| | |
|---|---|
| '09jan2008'd | '10jan2008'd |

In some implementations, the END variable in a data set may be omitted. In such a case, END defaults to one day prior to BEGIN in the following observation. The following table is roughly equivalent to the table above, where Jan. 10, 2008, is not a holiday. The END date for each observation is calculated as one less than the BEGIN date for the following observation.

| BEGIN |
|---|
| '01jan2008'd |
| '02jan2008'd |
| '03jan2008'd |
| '04jan2008'd |
| '07jan2008'd |
| '08jan2008'd |
| '09jan2008'd |
| '10jan2008'd |
| '11jan2008'd |
| '14jan2008'd |
| '15jan2008'd |
| '16jan2008'd |

Optionally, a system may include an extrapolating interval and alignment. This function may be used to extend the custom interval in a uniform fashion. For instance EXTRAP=(DAY,BEGIN) would calculate intervals before and after the custom interval definition as daily.

With reference back to FIG. 1, time is divided into 6 intervals per yearly period. There are 3 week-long intervals before Easter, 1 week-long interval containing Easter, 1 week-long interval following Easter, and the remainder of the year is a large inactive interval.

The following code can be used to define a data set that describes these intervals for the years 2005 to 2009.

```
data EasterCycles(keep=begin end season);
    format begin end DATE.;
    /* interval will cover all days between firstyear and lastyear */
    firstyear=2005;
    lastyear=2009;
    /* the active period will be -n = n activeints before easter to
            m = m activeints after easter */
    activestart = -3;
    activeend = 1;
    activeint = 'week.2';
    end = MDY(12,31,firstyear-1);
    do year=firstyear to lastyear;
        easter = HOLIDAY("EASTER",year);
        /* inactive period */
        begin = end + 1;
        end = INTNX(activeint,easter,activestart) - 1;
        season = 0;
        output;
        /* active periods */
        do i = activestart to activeend;
            begin = INTNX(activeint,easter,i);
            end = INTNX(activeint,easter,i,'end');
            season = i - activestart + 1;
            output;
        end;
    end;
    /* last inactive period */
    begin = end + 1;
    end = MDY(12,31,lastyear);
    season = 0;
    output;
run;
```

The resulting table describing the custom interval definition is shown below. The inactive season is given the seasonal index "0." The forecast for the inactive season will be 0. The "season" value can be used to evaluate seasonality for the original time series. The season identified as 4 is the week containing Easter.

| BEGIN | END | SEASON |
|---|---|---|
| Jan. 1, 2005 | Feb. 27, 2005 | 0 |
| Feb. 28, 2005 | Mar. 6, 2005 | 1 |
| Mar. 7, 2005 | Mar. 13, 2005 | 2 |
| Mar. 14, 2005 | Mar. 20, 2005 | 3 |
| Mar. 21, 2005 | Mar. 27, 2005 | 4 |
| Mar. 28, 2005 | Apr. 3, 2005 | 5 |
| Apr. 4, 2005 | Mar. 19, 2006 | 0 |
| Mar. 20, 2006 | Mar. 26, 2006 | 1 |
| Mar. 27, 2006 | Apr. 2, 2006 | 2 |
| Apr. 3, 2006 | Apr. 9, 2006 | 3 |
| Apr. 10, 2006 | Apr. 16, 2006 | 4 |
| Apr. 17, 2006 | Apr. 23, 2006 | 5 |
| Apr. 24, 2006 | Mar. 11, 2007 | 0 |
| Mar. 12, 2007 | Mar. 18, 2007 | 1 |
| Mar. 19, 2007 | Mar. 25, 2007 | 2 |
| Mar. 26, 2007 | Apr. 1, 2007 | 3 |
| Apr. 2, 2007 | Apr. 8, 2007 | 4 |
| Apr. 9, 2007 | Apr. 15, 2007 | 5 |
| Apr. 16, 2007 | Feb. 24, 2008 | 0 |
| Feb. 25, 2008 | Mar. 2, 2008 | 1 |
| Mar. 3, 2008 | Mar. 9, 2008 | 2 |
| Mar. 10, 2008 | Mar. 16, 2008 | 3 |
| Mar. 17, 2008 | Mar. 23, 2008 | 4 |
| Mar. 24, 2008 | Mar. 30, 2008 | 5 |
| Mar. 31, 2008 | Mar. 15, 2009 | 0 |
| Mar. 16, 2009 | Mar. 22, 2009 | 1 |
| Mar. 23, 2009 | Mar. 29, 2009 | 2 |
| Mar. 30, 2009 | Apr. 5, 2009 | 3 |
| Apr. 6, 2009 | Apr. 12, 2009 | 4 |
| Apr. 13, 2009 | Apr. 19, 2009 | 5 |
| Apr. 20, 2009 | Dec. 31, 2009 | 0 |

Figure 3:
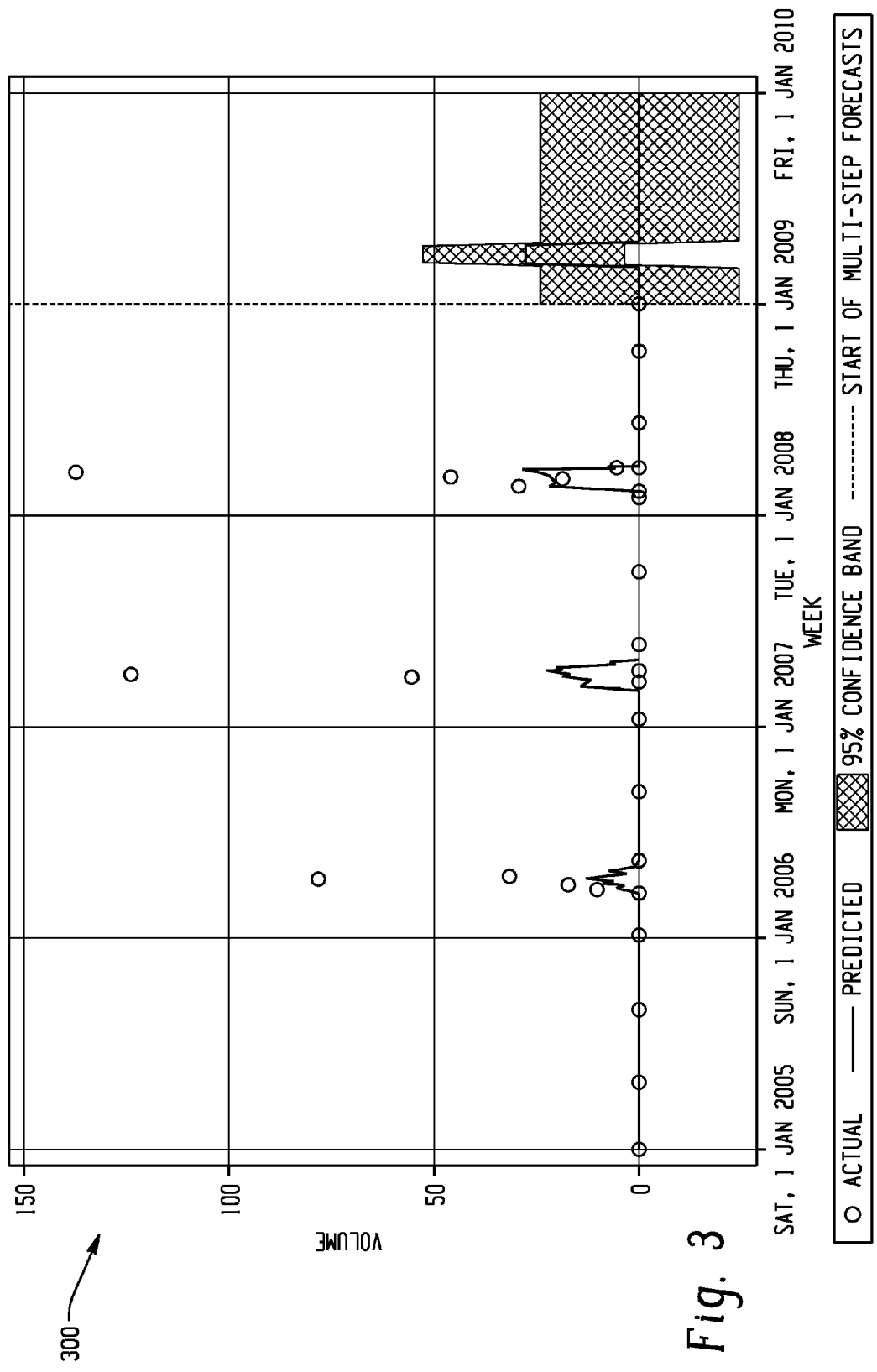
FIG. 3 is a graph depicting forecasts for the time series data using standard weekly interval time periods.

When forecasting using a standard weekly interval, as opposed to the intervals shown above, the large number of zero periods in the inactive season makes correct identification of the proper time series model difficult. FIG. 3 is a graph depicting forecasts for the time series data using standard weekly interval time periods. The plot using standard weekly intervals is in stark contrast to the plot using the custom intervals described above and shown in FIG. 1. The large number of zeros using standard weekly intervals makes it difficult for a system to accurately predict sudden changes in volume.

Figure 4:
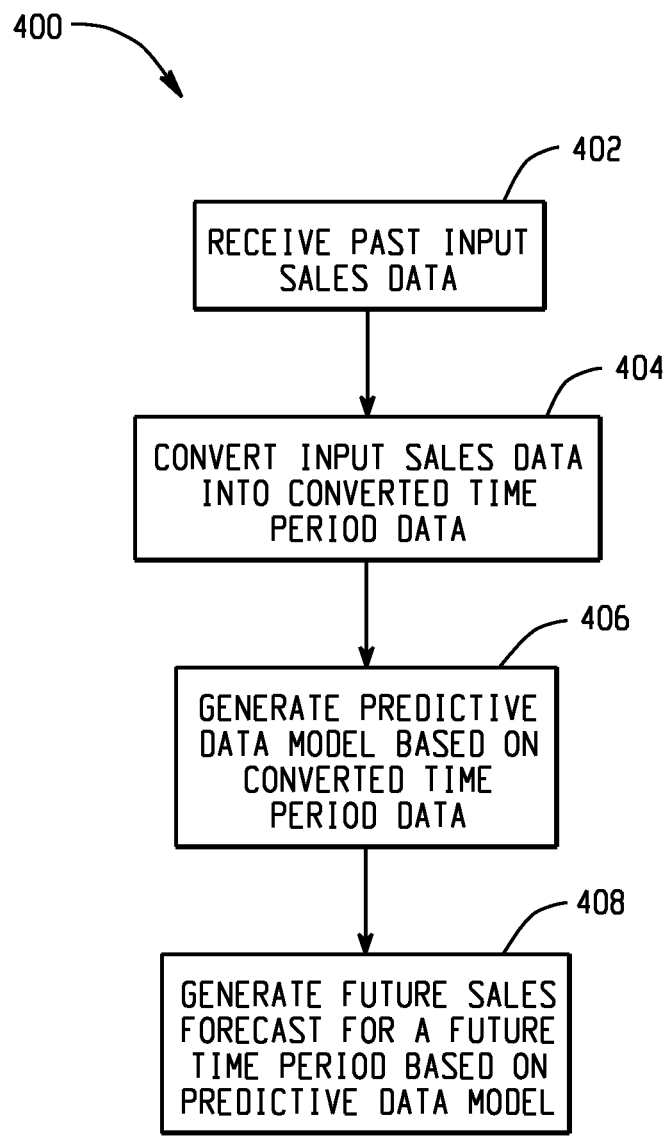
FIG. 4 is a flow diagram depicting a computer-implemented method for generating a future sales forecast for a future time period in a system where at least one converted time period is of irregular length with respect to other time periods.

FIG. 4 is a flow diagram depicting a computer-implemented method for generating a future sales forecast for a future time period in a system where at least one converted time period is of irregular length with respect to other time periods. At 402, past input sales data is received. The input sales data may includes aggregate sales values representing a volume of sales for an input sales period where all input time periods are of uniform length. At 404, the input sales data is converted into converted time period data by assigning a sum of sales from a plurality of input periods into a single converted time period. A predictive data model is generated at 406 based on the converted time period data. At 408, a future sales forecast is generated for a future time period based on the predictive data model.

An irregular time period data modeler may be used in a variety of contexts. For example:

An irregular time period data modeler may be used in forecasting of highly seasonal time series, for example, sales of bathing suits.

An irregular time period data modeler may also be used in calculations for businesses with non-standard fiscal accounting periods. Businesses often close their months, quarters, or years based on profitability or staff availability. Other businesses do not operate on a standard monthly or quarter calendar, and may instead use periods that vary, for example from 17 to 20 days in length.

An irregular time period data modeler may be used to count time periods such as business (working) days where certain time periods should be excluded, for example holidays, irregular weekends, or other closed periods.

An irregular time period data modeler may be used to filter out erroneous data, such as a transaction which occurs during a non-business period.

An irregular time period data modeler may be used when the active seasonal cycle moves in time, such as an active season that exists from Easter to Labor Day or during summer vacation. Neither Easter, nor the last day of school are fixed dates.

An irregular time period data modeler may be used for non-standard seasonal dummies. For example, when not all seasonal cycles contain the same seasonal periods.

An irregular time period data modeler may be used to identify inactive periods in the seasonal cycle, so that these periods can be processed in a different manner than the active periods.

Example products which might use these capabilities include ETS (econometric time series), HPF (High-Performance Forecasting), RISK, Demand Intelligence, OR, SAS/GRAPH.

As noted above, and illustrated in the contrast between the graphs of FIGS. 1 and 3, the use of custom time intervals can offer improvements in forecasting capabilities and accuracy. The duration of a custom time interval is oftentimes instinctual or driven by known business rules. For example, when determining intervals for business days during a week, it makes sense to deal with weekend days and holidays differently than normal Mondays-Fridays.

While custom time intervals may be useful in dealing with known periods of lesser activity or total inactivity, custom time intervals may also provide significant forecasting benefits in systems where the custom time intervals are not known prior to some data analysis. Thus, a system may include some mechanisms for defining the custom intervals in addition to capabilities for providing forecasts based on data adapted to those custom intervals.

For example, custom intervals may be utilized to improve stationarity of a received time series data set. Stationarity may be a necessary condition in order to produce a reliable statistical forecast. Oftentimes, discrete time series do not possess this stationarity characteristic. Statistical forecasting is performed by taking a sample at discrete time intervals and treating the sampled values as a discrete time series. The goal of forecasting is often to generate a model with errors that are white noise. Utilizing equally spaced intervals assumes that if the original continuous process has errors that are white noise, then the sample of such process, which is an integral of the continuous process over intervals of equal length, will also have errors that are white noise. Discrete time series are classified as stationary or non-stationary based on the properties of the errors.

Large amounts of data are collected and stored in databases as time series data. Much of this data is unsuitable for econometric modeling and forecasting in its raw format (e.g., because of a lack of stationarity in the time series data). Existing algorithms for improving characteristics of time series data tend to be top-down. Top-down algorithms try to minimize the number of points required to represent the series while also minimizing the error between the original series and the segmented series. Another approach, which is described herein, is bottom-up. This bottom-up algorithm preserves data points unless they can be represented reasonably well using a single segment. The focus of the bottom-up algorithm is to identify segments where the variance of the errors is uniform. The focus is not on the overall error, but on the nature of the errors within each segment.

Figure 5:
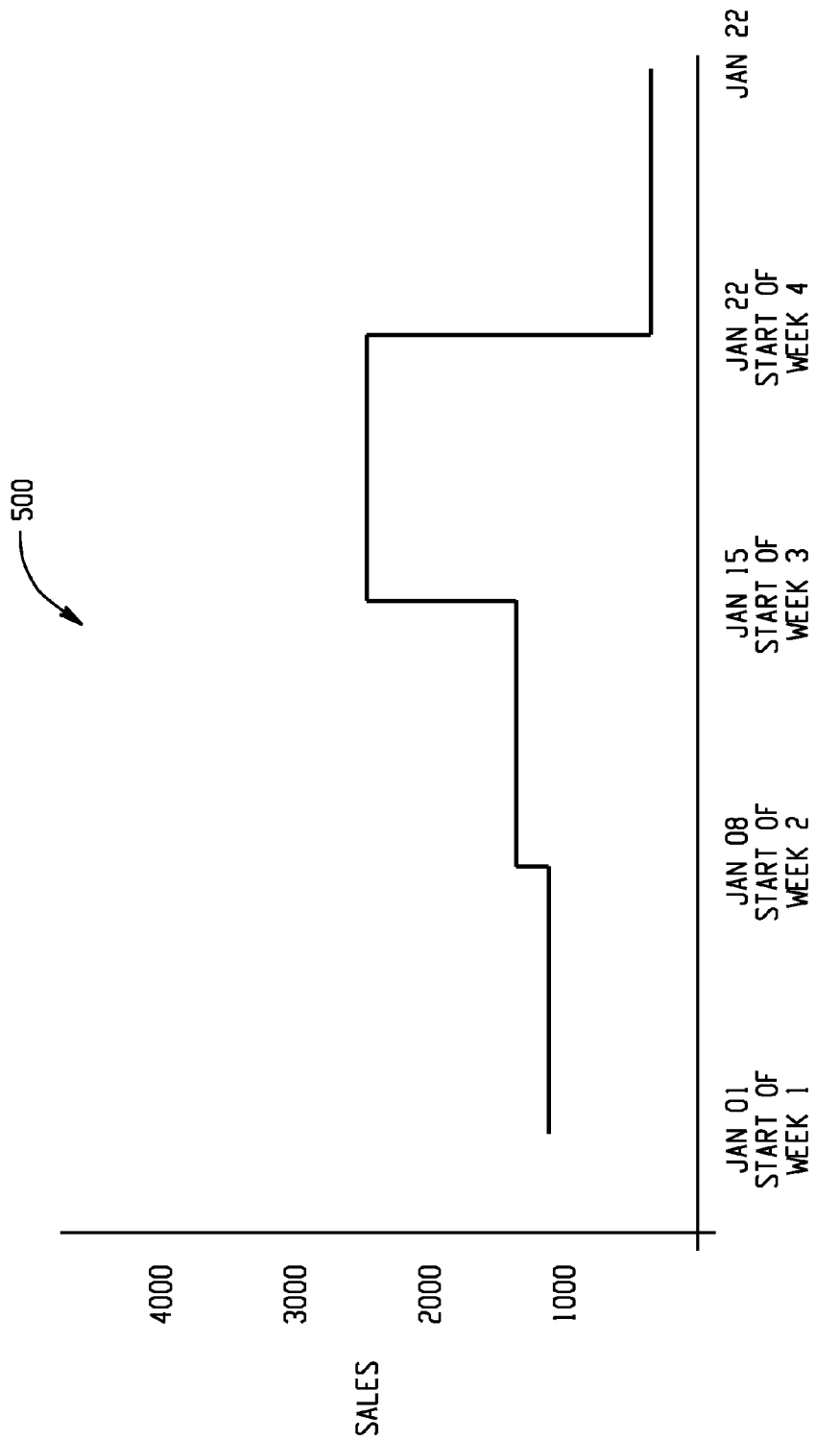
FIG. 5 depicts a plot of an example data set showing sales of a product per week.

FIG. 5 depicts a plot of an example data set showing sales of a product per week. In the example data set, sales are about 1000 for week 1 and increase to about 1200 in week 2. Week 3 had sales of around 2500 with week 4 sales dropping to around 300. Traditional methods may forecast future sales based on the four uniform standard week time periods shown in FIG. 5. However, improved forecasting (e.g., the contrast between the examples of FIG. 1 and FIG. 3) may be enabled if certain of the depicted time periods were combined to generate custom time intervals of differing lengths.

Figure 6:
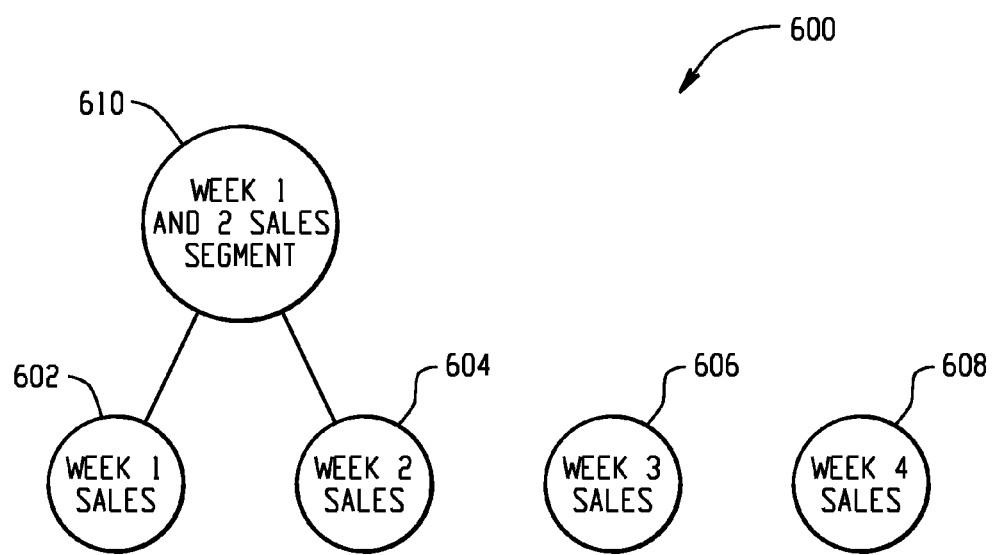
FIG. 6 is a diagram depicting an example combination of time series data to generate a combined segment.

FIG. 6 is a diagram depicting an example combination of time series data to generate a combined segment. A segment contains one or more time series data values. Thus, the example of FIG. 5 initially includes four segments, shown in FIG. 6 as 602, 604, 606, and 608. As noted above, performance gains may be realized when certain segments are combined, which may result in time intervals of irregular length (custom time intervals). For example, it may be determined that two segments should be combined to form a combined segment when the time series data within those two segments is sufficiently similar (e.g., it may be desirable to combine the week 1 segment 602 with the week 2 segment 604 based on the similarity of their time series data based on the two candidate segments having variances that differ by less than 10%, and trends that differ by less than 10%). Similarity of data may be measured in a variety of ways, as described further herein. When two segments 602, 604 are deemed sufficiently similar as to be combined, then the time series data from those segments is merged to generate a combined segment 610.

Figure 7:
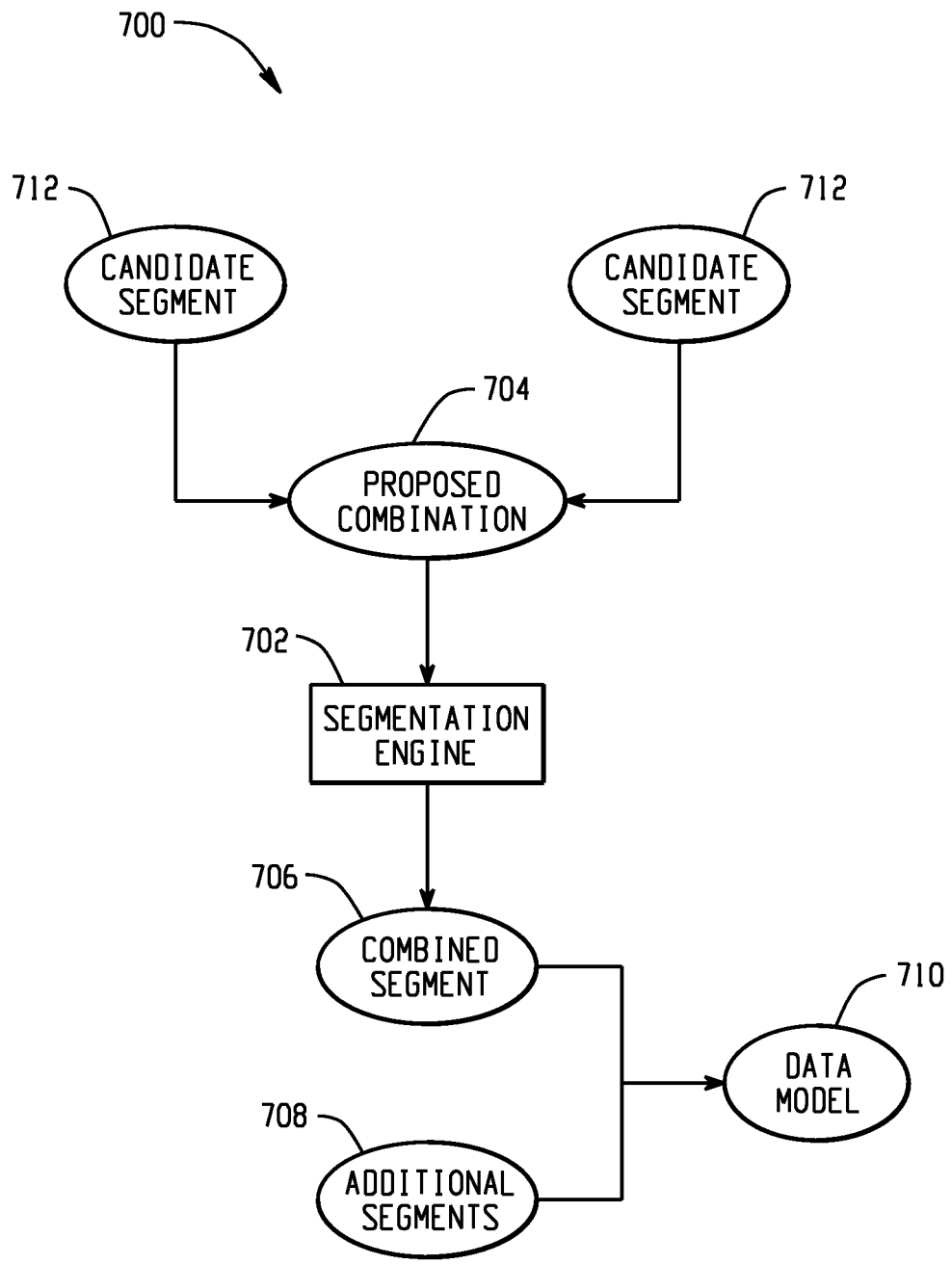
FIG. 7 is a block diagram depicting an example generation of a data model based on combined segments.

FIG. 7 is a block diagram depicting an example generation of a data model based on combined segments. A time series data set includes a number of segments, wherein a segment contains one or more time series data values. A segmentation engine 702 analyzes one or more proposed combinations 704 of segments to determine which of those proposed combinations 704 should be acted upon to generate a combined segment 706. A combined segment 706 may be represented as a data structure that contains or contains references to all of the time series data values of the candidate segments on which the combined segment 706 is based. A combined segment 706 may be used in conjunction with one or more additional segments 708 to generate a data model 710 that may be used in forecasting data.

A proposed segment combination 704 may be based on two or more candidate segments 712. Each of the candidate segments 712 contain one or more time series data values. The candidate segments may contain a single time series data value, or the candidate segments 712 may be combined segments themselves, which contain multiple time series data values based on one or more previous combinations.

Figure 8:
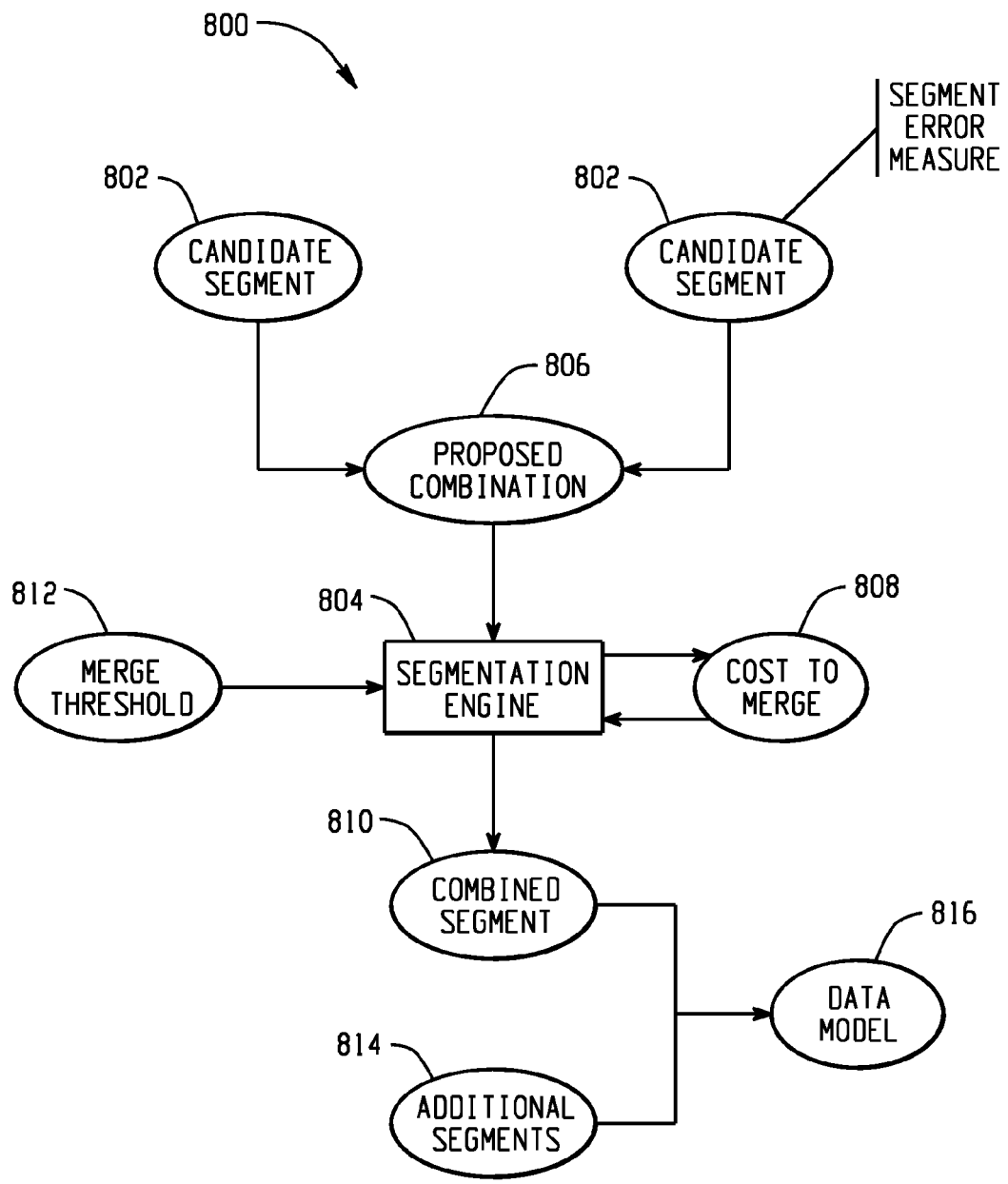
FIG. 8 is a block diagram depicting example details of a generation of a data model based on combined segments.

FIG. 8 is a block diagram depicting example details of a generation of a data model based on combined segments. Two candidate segments 802 are presented to a segmentation engine 804 as a proposed combination 806. One of the candidate segments 802 is characterized by a segment error measure. The segmentation engine 804 determines an error cost to merge 808 for the proposed combination 806. The error cost to merge 808 may be calculated based on a variety of factors related to and parameters of the proposed combination 806 including the segment error measure. Based on the determined error cost to merge 808, the segmentation engine 804 determines whether to act on the proposed combination 806 to generate a combined segment 810. For example, the segmentation engine 804 may compare the error cost to merge 808 with a merge threshold 812 to determine whether a merge operation should be performed. For example, the two candidate segments 802 may be combined when the error cost to merge 808 is greater than the merge threshold 812 or greater than or equal to the merge threshold 812. In another example, the two candidate segments may be combined when the error cost to merge 808 is less than the merge threshold 812 or less than or equal to the merge threshold 812. A combined segment 810 may be used in conjunction with one or more additional segments 814 to generate a data model 816 that may be used in forecasting data.

Figure 9:
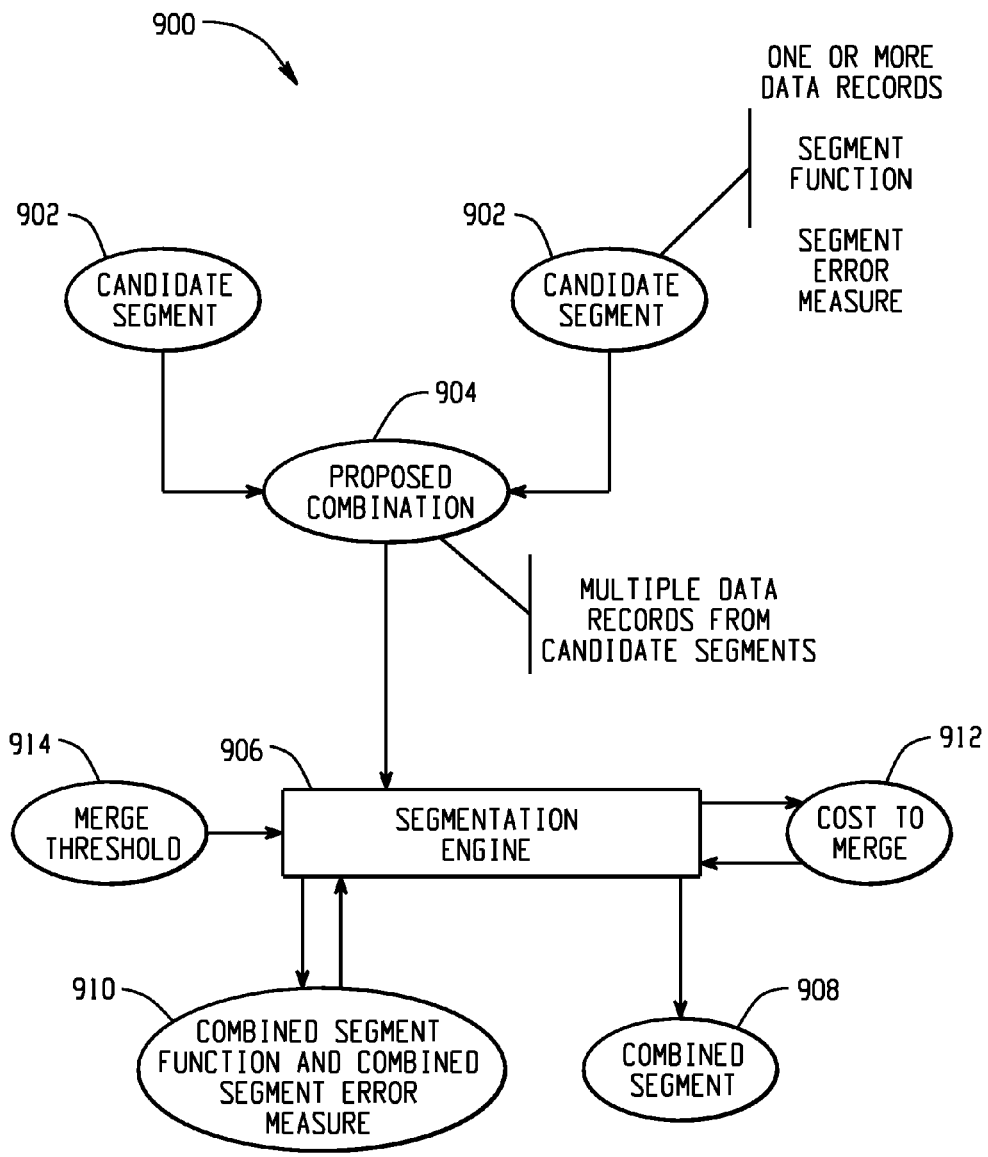
FIG. 9 is a block diagram depicting parameters determined for candidate segment and calculations made by a segmentation engine to determine a cost to merge.

FIG. 9 is a block diagram depicting parameters determined for a candidate segment and calculations made by a segmentation engine to determine a cost to merge. A candidate segment 902 includes one or more time series data values or data records. A segment function is calculated for one or more of the candidate segments 902. A segment function is a statistical (e.g., polynomial) fit of the values of the data records within the candidate segment 902. A segment error measure may also be associated with the candidate segment 902. The segment error measure identifies a quality of fit of the segment function to the values of the data records within the candidate segment 902. Thus, the segment error measure identifies a difference between the segment function and the actual values of the data records.

A proposed combination 904 contains a merge of the data records contained in the candidate segments 902 from which the proposed combination 904 is derived. The segmentation engine 906 analyzes the multiple points from the candidate segments 902 to determine whether the candidate segments 902 in the proposed combination 904 should be combined to form a combined segment 908. For example, the segmentation engine 906 may calculate a combined segment function and combined segment error measure 910 for the proposed combination 904. The combined segment function is a statistical fit of the values of the multiple data records within the proposed combination 904. The combined segment error measure identifies a quality of fit of the combined segment function to the values of the multiple data records within the proposed combination 904. Error measures may take a variety of forms. For example, an error measure may be a statistic of fit measuring a quality of fit of a segment function to the values of the multiple data records within a segment or proposed combination.

The segmentation engine 906 may use the combined segment function and the combined segment error measure 910 to calculate a cost to merge 912 for the proposed combination 904. The cost to merge may be calculated in many different ways. For example, the cost to merge may be calculated as a percentage increase in error (cost) between a candidate segment 902 and the proposed combination 904. If σ represents a candidate segment error measure and σ' represents a combined segment error measure, then $d_i = \sigma_i' - \sigma_i$ represents an absolute difference between the combined segment error measure and the segment error measure. The percentage increase in cost may then be calculated as $p_i = d_i / \sigma_i'$.

In some implementations, $p_i$ is considered the cost to merge 912 and is compared to the merge threshold 914. If $p_i$ is less than the merge threshold 914, then the proposed combination 904 is considered a good candidate for merging, and the proposed combination 904 is combined to form the combined segment 908. In some implementations, either or both of $d_i$ and $p_i$ are considered the cost to merge 912 and are compared to appropriate merge thresholds 914. If either $d_i$ or $p_i$ are less than or equal to their merge threshold 914 (also referred to as a critical value) then the candidate segments 902 in the proposed combination 904 are merged.

In some implementations, the calculation of $p_i$ may be more complex to account for special cases (e.g., where certain values are zero). For example, $p_i$ may be calculated as:

$$p_i = \begin{cases} \dfrac{d_i}{m_i} & \text{if } m_i \neq 0 \text{ and } \sigma_i = 0 \\ \dfrac{d_i}{\sigma_i'} & \text{if } \sigma_i' \neq 0 \\ 0 & \text{otherwise,} \end{cases}$$

where $m_i$ is the constant term of the segment function for a candidate segment. The following table lists a number of cases for $p_i$ based on the above definition.

| Case | $\sigma$ | $\sigma_i'$ | $m_i$ | $d_i$ | $p_i$ |
|---|---|---|---|---|---|
| 1 | 0 | 0 | 0 | 0 | 0 |
| 2 | 0 | 0 | b | 0 | $\dfrac{d_i}{m_i} = 0$ |
| 3 | 0 | é | 0 | é | $\dfrac{d_i}{\sigma_i'} = 1$ |
| 4 | 0 | é | b | é | $\dfrac{d_i}{m_i} = \dfrac{\acute{e}}{b}$ |
| 5 | e | 0 | 0 | * | * |
| 6 | e | 0 | b | * | * |
| 7 | e | é | 0 | é − e | $\dfrac{d_i}{\sigma_i'} = \dfrac{\acute{e} - e}{\acute{e}}$ |
| 8 | e | é | b | é − e | $\dfrac{d_i}{\sigma_i'} = \dfrac{\acute{e} - e}{\acute{e}}$ |

It is noted that cases 5 and 6 cannot occur because a method that does not fit exactly n points cannot fit exactly m>n points. Cases 1 and 2 are no cost merges. They have a cost of zero and usually occur early in a segmentation process. Cases 3 and 4 are low cost merges. For case 3, merging usually occurs when e'≤$CV_d$ (critical value for d). For case 4, merging usually occurs when e'/b≤$CV_p$ (critical value for p). Cases 7 and 8 are higher cost merges. For these cases, merging usually occurs when p≤$CV_p$.

Figure 10:
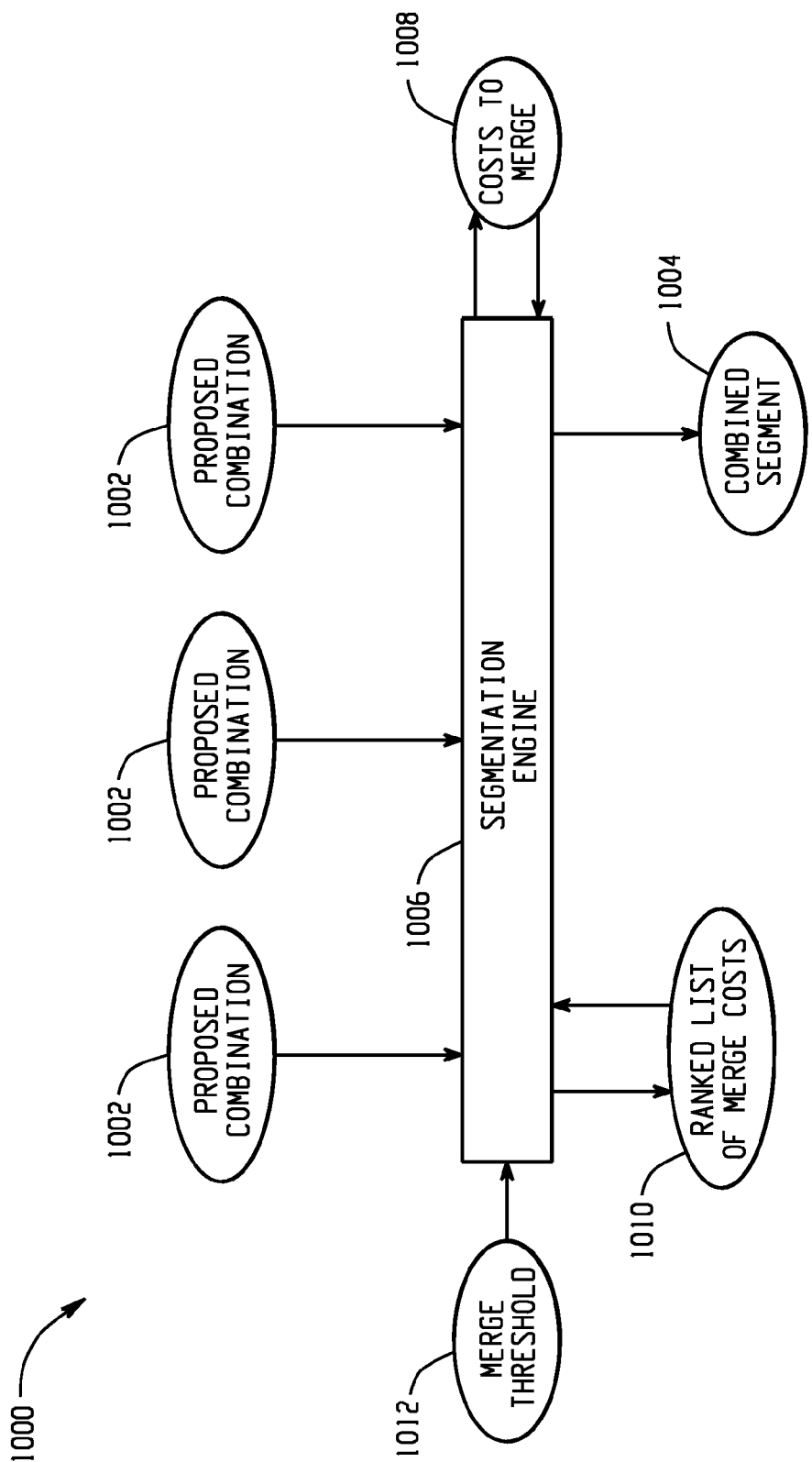
FIG. 10 is a block diagram depicting a segmentation engine selecting from among several proposed combinations for creating combined segments.

FIG. 10 is a block diagram depicting a segmentation engine selecting from among several proposed combinations for creating combined segments. For large data sets, there may be thousands or more segments containing one or more data records or time series data values. As noted above, forecasting performance may be improved by reducing a total number of segments by combining segments. Performance may be further improved by searching for best proposed combinations from a population of proposed combinations. A cost to merge versus threshold comparison for proposed combinations combines candidate segments when they are sufficiently good to meet the merge threshold. However, such a process may not find the best combinations. FIG. 10 further optimizes the segmentation process by comparing multiple proposed combinations 1002 prior to generating a combined segment 1004. A segmentation engine 1006 receives a plurality of proposed combinations 1002. The segmentation engine 1006 calculates costs to merge 1008 for each of the plurality of proposed combinations 1002. The segmentation engine 1006 then generates a rank list 1010 of the costs to merge 1008 for the proposed combinations 1002. The ranked list 1010 identifies the proposed combination 1002 having the lowest cost to merge 1008. The segmentation engine 1006 may then generate a combined segment 1004 for the proposed combination 1002 having the lowest cost to merge 1008 if that lowest cost to merge 1008 is less than or equal to the merge threshold 1012. This ranking and merging process may continue for a prespecified number of iterations, until the no proposed combinations 1002 have a cost to merge 1008 that meets the merge threshold 1012, or until another criteria is met.

Figure 11:
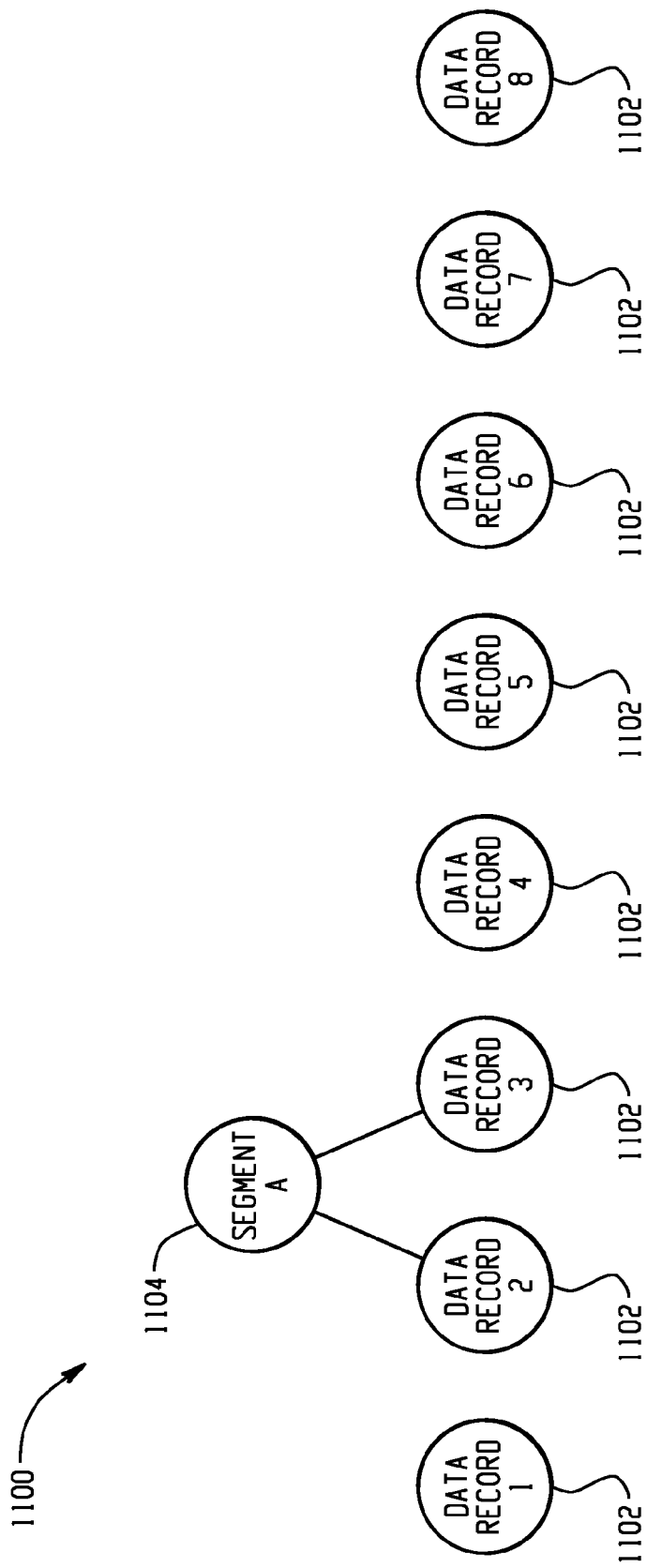
FIGS. 11-13 depict a segmentation example.
Figure 12:
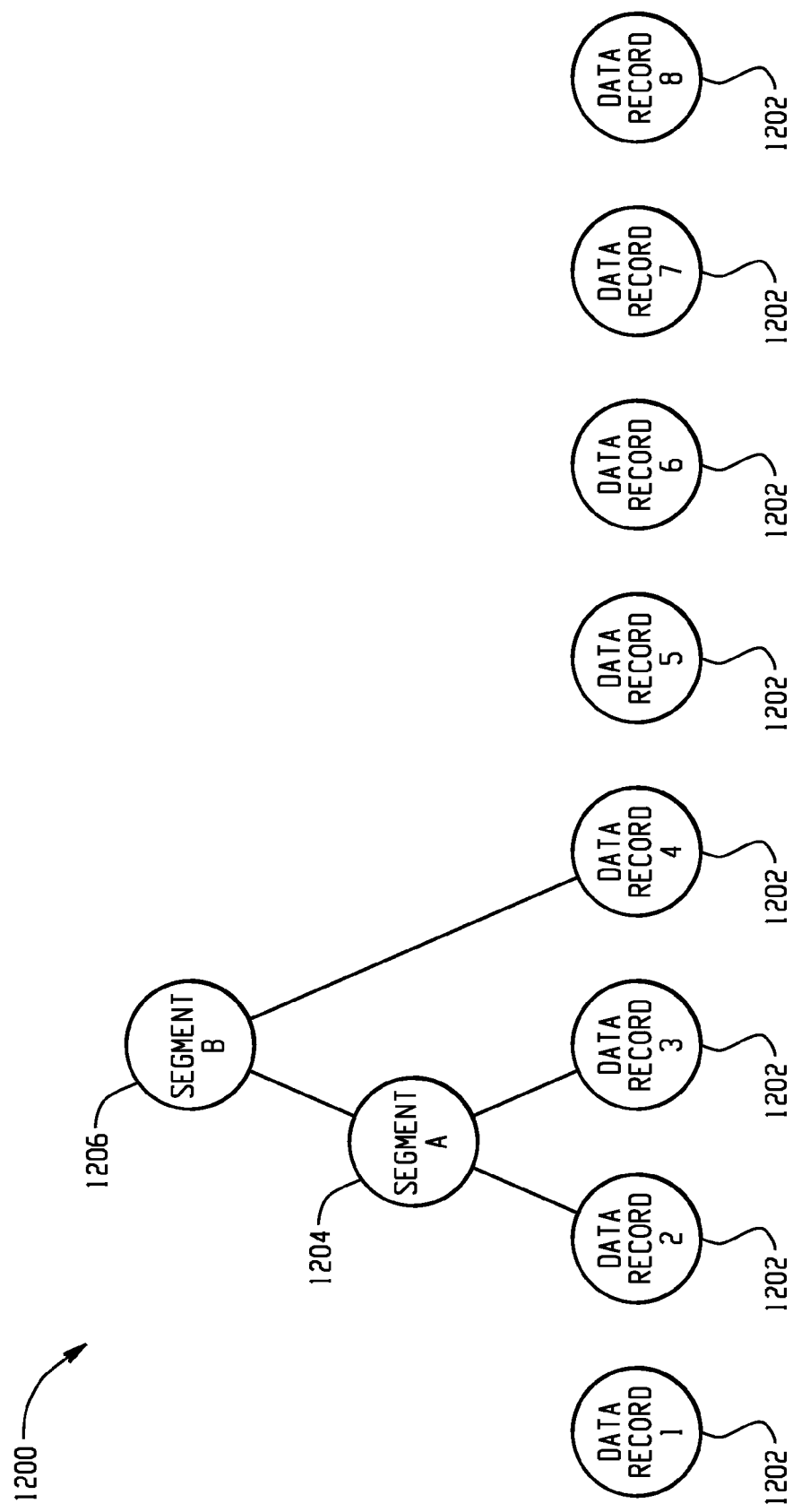
Figure 13:
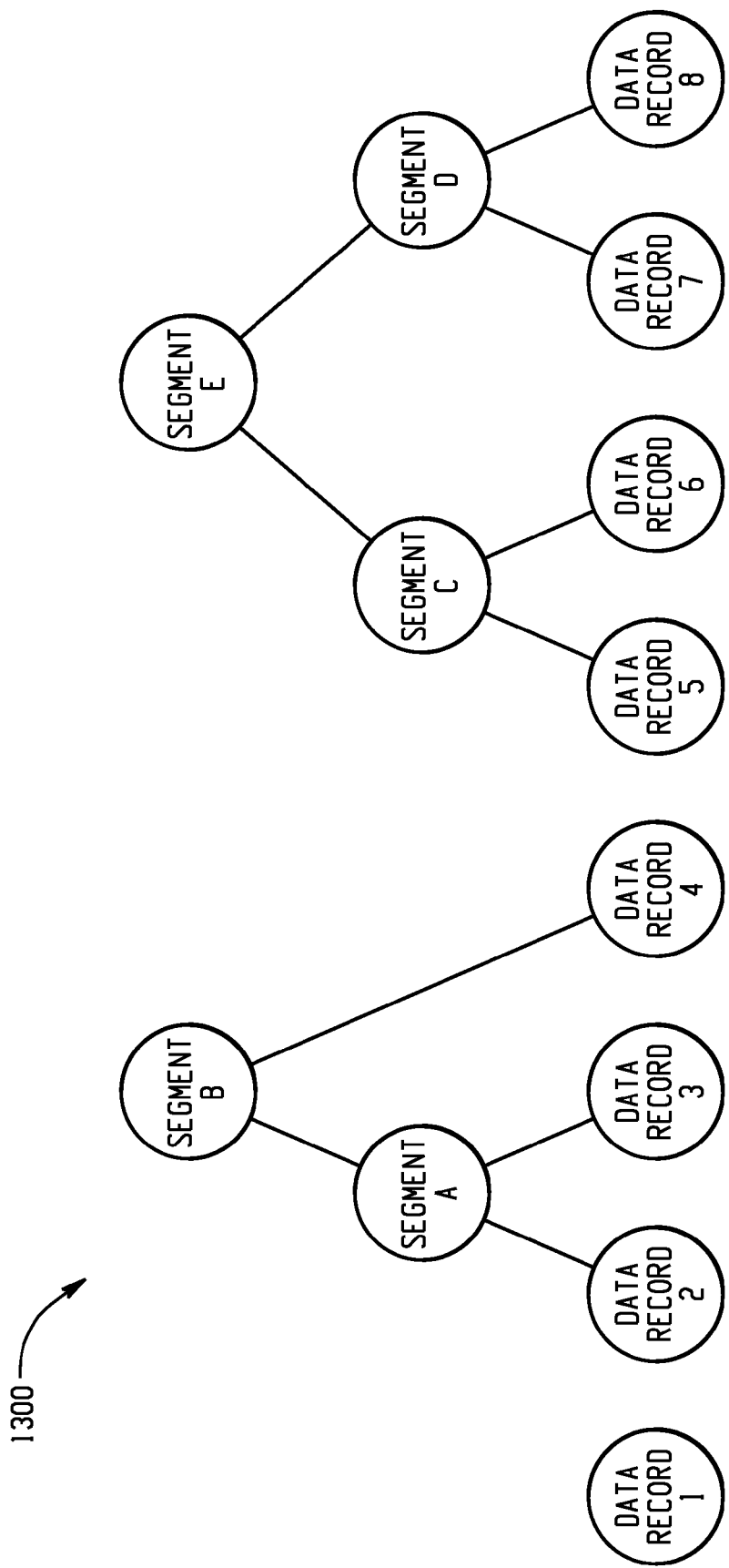

FIGS. 11-13 depict a segmentation example. A set of time series data is received, where the time series data set includes a number of data records. In FIG. 11, the received data records form initial segments 1102, where each segment 1102 contains a single data record. Costs to merge are calculated for proposed combinations of each adjacent pair of segments (e.g., cost to merge the segment containing data record 1 with the segment containing data record 2, cost to merge the segment containing data record 2 with the segment containing data record 3, etc.). A list of proposed combinations of segments 1102 is generated and sorted by the cost to merge. The proposed combination of the segment containing data record 2 and the segment containing data record 3 has the lowest cost to merge and also meets the merge threshold. Thus, segment A is generated, containing data record 2 and data record 3.

The process is repeated in FIG. 12, with costs to merge being calculated for proposed segment combinations (e.g., cost to merge the segment containing data record 1 with the segment A, cost to merge the segment A with the segment containing data record 4, cost to merge the segment containing data record 4 with the segment containing data record 5, etc.). A list of proposed combinations of segments 1202, 1204 is generated and sorted by the cost to merge. The proposed combination of segment A and the segment containing data record 4 has the lowest cost to merge and also meets the merge threshold. Thus, segment B is generated containing the data records in segment A and data record 4.

The process is repeated three more times in FIG. 13. In FIG. 13, the list is again generated based on costs to merge of proposed combinations. Segment C is created based on the segment containing data record 5 and the segment containing data record 6. Segment D is created based on the segment containing data record 7 and the segment containing data record 8. Segment E is created based on segment C and segment D.

Figure 14:
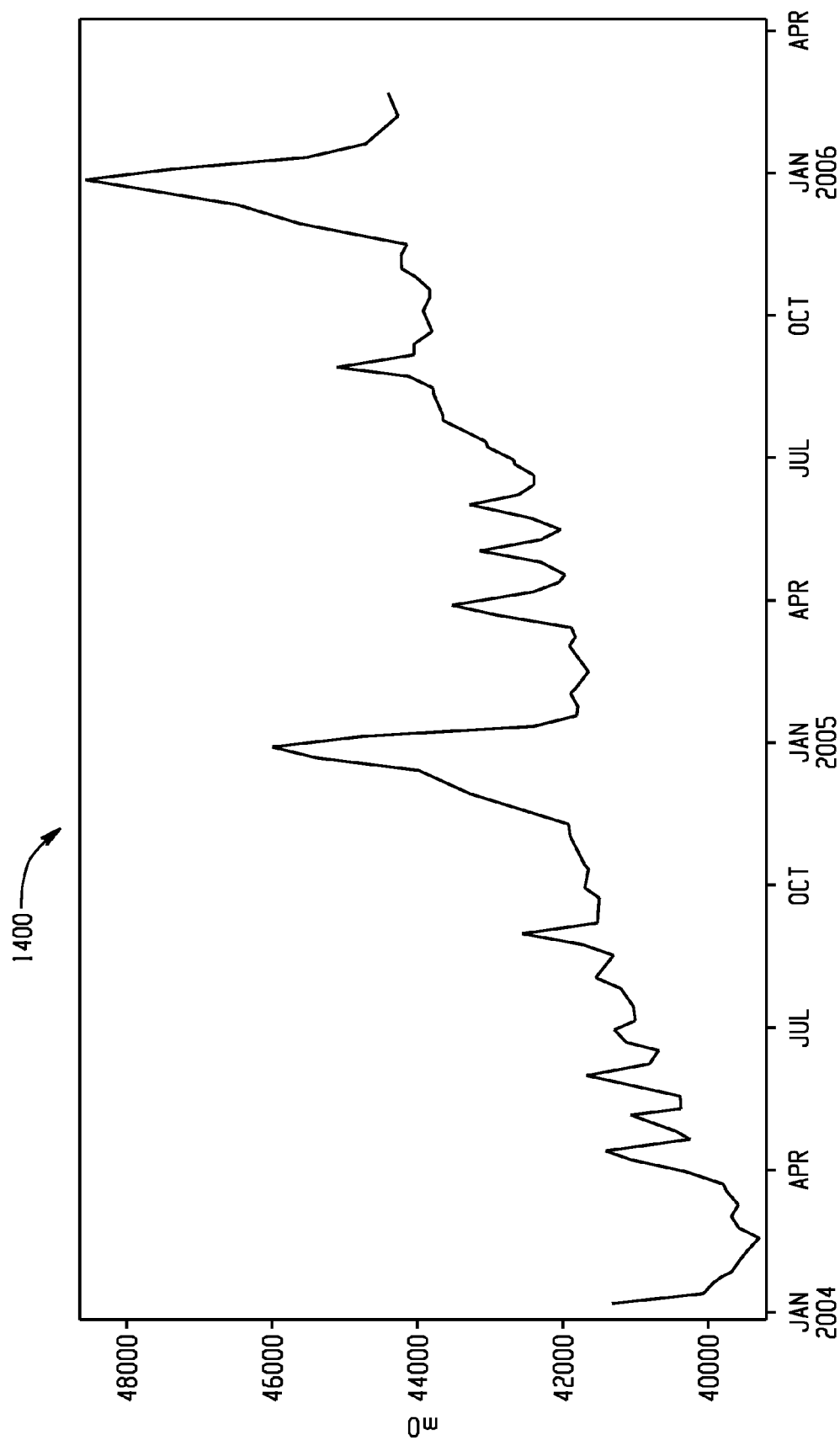
FIGS. 14-16 depict example differences between fits of segmented time series data and the time series data itself according to merge threshold selection (critical value selection).
Figure 15:
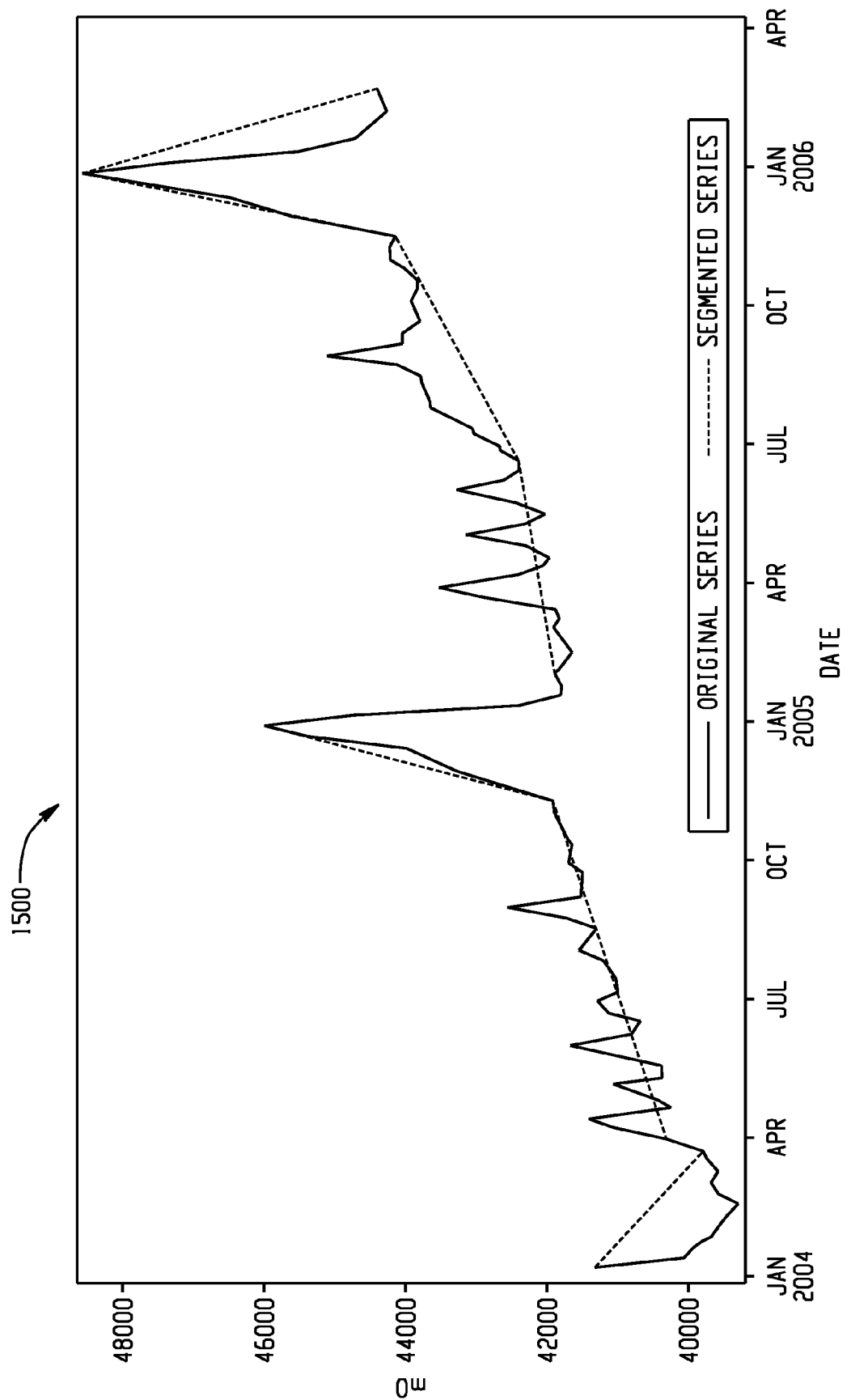
Figure 16:
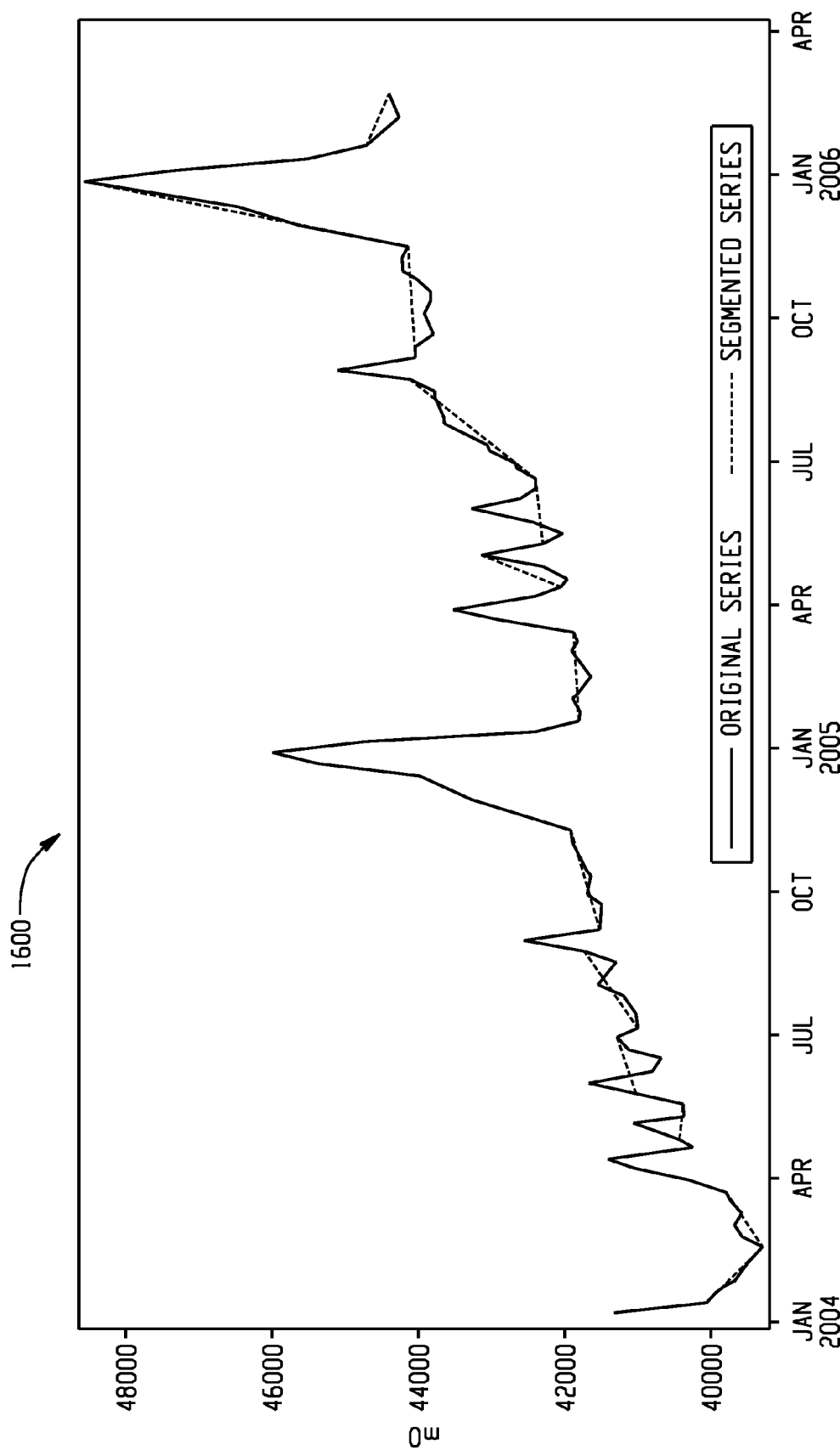

FIGS. 14-17 depict example differences between fits of segmented time series data and the time series data itself according to merge threshold selection (critical value selection). In FIG. 14, $CV_d$ and $CV_p$ are selected as zero. Thus, no error is allowed, and segments are joined only if the fit is exact. The result is an exact fit of the original time series. FIG. 15 is an example where the critical values $CV_d$ and $CV_p$ are selected to allow a higher error. The major peaks of the series (e.g., the large peaks 1502 at Christmas) are identified. FIG. 16 shows an example where critical values are chosen to allow moderate error. In FIG. 16, large and medium peaks in the series are identified while lower level noise is filtered.

The clustering process described herein may be utilized in a variety of contexts. For example, clustering can be used in decomposing time-series data. Given a single time series (original series), decompose the original series by determining the major (long-term) feature, remove the major feature from the original series to obtain the minor (short-term) features. For example, this analysis is useful for regular/promotional price analysis where the original series is the sale price of a product, where the major features are regular prices (long-term), and where the minor features are the promotional prices (short-term).

Clustering can also be used in customizing discrete time intervals. Given a single time series, it may be useful to differentiate time periods with high and low activity in order to customize a time interval that makes the series more readily explainable and/or easier to model for subsequent forecasting. For example, given a time series of seasonal products where there are both in-season (high activity) and off-season (low activity) periods, it may beneficial to map the off-season period into a single time period.

Clustering may also be used in a turning point analysis. Given a single time series, major change points can be extracted for the time series. These change points may be useful for determining turning points in the series for subsequent turning point analysis. Turning point analysis is useful for forecasting the life-cycle of products in the marketplace.

Clustering may further be used in comparing time series. Given several time series of varying length, extract the major features using fixed length segmentation analysis. Comparing fixed length data vectors is far easier than comparing variable length data vectors. For example, this analysis is useful for time series search and retrieval, ranking, clustering, and other data mining analyses related to time series.

Clustering may also be used in visualizing time series data. Given a long time series, it may be difficult to perceive major features associated with the time series when viewing a typical (detailed) time series plot. By extracting the important features, the time series may be easier to understand when viewed with less detail.

Several algorithms may be useful for a system to perform operations using custom intervals. The following describes details of certain algorithms:

Increment k Intervals from a Starting Point t1, Return t2 Aligned to Either Beginning or End of Target Interval (SAS function INTNX): Given a custom interval data table, first locate the observation in the interval data set whose data in the BEGIN and END variables bracket t1. The data table pointer is then moved k observations. A value of k>0 moves the data table pointer k observations forward, and k<0 moves the pointer backward. The interval at the resulting location in the data set is the desired interval after incrementing (decrementing).

Given a custom interval data table with MAXOBS observations, let Bi be the value of BEGIN at observation i, and Ei be the value of END at observation i. Then, pseudocode is:

```
// find number of the observation which brackets starting date t1
found = 0
i = 1
while (!EOF and !found) {
    if ( Bi <= t1 and t1 <= Ei) {
        found = 1
        break
    }
    i++
}
// t1 might be outside bounds of this finite interval definition
if (!found) error
// move k intervals
i+= k;
// t2 might be outside bounds of this finite interval definition
if (i <1 or i > MAXOBS) error
// choose the identifying date for the interval based on align to
    beginning or end of interval
if (alignment = begin)
    t2 = Bi
else
    t2 = Ei
```

Determine the Number of Intervals, k, Between Two Dates, t1 and t2:

If t2>t1, k>=0. If t2<t1, k<=0. (SAS function INTCK) Let the row number of the interval data table in which the BEGIN and END variables bracket t1 be 't1obs'. Likewise, let the observation number in which the same variables bracket the t2 date be 't2obs'. The number of intervals between t1 and t2 is then calculated as (t2obs−t1obs). Consistent with the increment/decrement problem, a negative value may be calculated.

The pseudocode is:

```
// find number of the observation which brackets starting date t1
found = 0
i = 1
while (!EOF and !found) {
    if ( Bi <= t1 and t1 <= Ei) {
        found = 1
        break
    }
    i++
}
// t1 might be outside bounds of this finite interval definition
if (!found) error
t1obs = i;
// find number of the observation which brackets starting date t2
found = 0
i = 1
while (!EOF and !found) {
    if ( Bi <= t2 and t2 <= Ei) {
        found = 1
        break
    }
    i++
}
// t2 might be outside bounds of this finite interval definition
if (!found) error
t2obs = i;
k = t2obs − t1obs;
```

Determine Seasonal Period (SAS function INTSEAS): Given a custom interval data table, read each observation and determine the maximum value of the SEASON variable, SeasPer, and return SeasPer. This value is the Seasonal Period of the custom interval. Given a custom interval data table with MAXOBS observations, let Si be the value of SEASON at observation i. Then, pseudocode is:

```
// find maximum value of SEASON
SeasPer = 0
i = 1
while (!EOF) {
    if ( Si > SeasPer ) {
        SeasPer = Si
    }
    i++
}
```

For instance, in example 2, if the name of the custom interval is EasterCycle, then the Seasonal Period of EasterCycle is 5.

Determine Seasonal Cycle (SAS function INTCYCLE): First determine the Seasonal Period. The Seasonal Cycle is then <name of custom interval><seasonal period>. For instance, in example 2, if the name of the custom interval is EasterCycle, then the Seasonal Cycle of EasterCycle is "EasterCycle 5".

Determine Seasonal Index (SAS function INTINDEX): Determine the seasonal index, Seasi, given a date, t1. Given a custom interval data table, first locate the observation in the interval data set whose data in the BEGIN and END variables bracket t1. The value of SEASON at that observation is the seasonal index, Seasi. Given a custom interval data table with MAXOBS observations, let Si be the value of SEASON at observation i, let Bi be the value of BEGIN at observation i, and Ei be the value of END at observation i. Then, pseudocode is:

```
// find number of the observation which brackets starting date t1
found = 0
Seasi = 0
i = 1
while (!EOF and !found) {
    if ( Bi <= t1 and t1 <= Ei) {
        found = 1
        Seasi = Si
        break
    }
    i++
}
// t1 might be outside bounds of this finite interval definition
if (!found) error
```

For instance, in example 2, if name of the custom interval is EasterCycle, then the Seasonal Index of Mar. 21, 2005 for EasterCycle is 4.

Determine Seasonal Cycle Index (SAS function INTCINDEX): Determine the seasonal index, Ci, given a date, t1. Given a custom interval data table, locate the observation in the interval data set whose data in the BEGIN and END variables bracket t1. While locating the observation, compute the cycle using the following algorithm, each time the SEASON variable is less than the previous SEASON variable, increment the Cycle Index. Given a custom interval data table with MAXOBS observations, let Si be the value of SEASON at observation i, let Bi be the value of BEGIN at observation i, and Ei be the value of END at observation i. Then, pseudocode is:

```
// find number of the observation which brackets starting date t1
found = 0
i = 1
Ci = 1;
```

-continued
```
    Sprev = S1;
    while (!EOF and !found) {
        if ( Si < Sprev ) Ci++
        if ( Bi <= t1 and t1 <= Ei) {
            found = 1
            break
        }
        Sprev = Si;
        i++
    }
    // t1 might be outside bounds of this finite interval definition
    if (!found) error
```

For instance, in the example of FIG. 1, if name of the custom interval is EasterCycle, then the Cycle Index of EasterCycle for Apr. 24, 2006 is 3. The first cycle is Jan. 1, 2005 to Apr. 3, 2005; the second cycle is Apr. 4, 2005 to Apr. 23, 2006.

Test for Valid Interval (SAS function INTTEST): Open the file specified by the custom interval and determine if the file contains a BEGIN variable. If this is successful, return 1 for a valid interval. If not, return 0 for an invalid interval.

Determine Sub-Alignment Interval (SAS function INTSHIFT): The Sub-Alignment interval for a custom interval of the form <custom interval> or <custom interval><m> or <custom interval><m>.<s> is <custom interval>, if <custom interval> is a valid interval. For instance, in example 2, the Sub-Alignment Interval for both "EasterCycle" and "EasterCycle5" would be "EasterCycle".

Determine Display Format (SAS function INTFMT): Open the file containing the custom interval definition and determine the format of the BEGIN variable. This format is returned as fmt. In Example 2, if the name of the custom interval is EasterCycle, then the format of EasterCycle is "DATE." as specified by the user in the statement: format begin end DATE.

This knowledge also indicates whether the custom interval is of type DATE, DATETIME, or OBSERVATION. This knowledge allows varying formats to be matched. For example, a timestamp of Jan. 1, 2008 2:00 PM could be matched to the first observation in Example 1, allowing matching of dates and times.

Alternate algorithms may be utilized when multiple and shifted custom intervals are used are as follows:

Increment k Intervals from a Starting Point t1, Return t2 Aligned to Either Beginning or End of Target Interval:

Here the interval is of the format <custom interval><m>.<s>. (SAS function INTNX) Given a custom interval data table, first locate the observation in the interval data set whose data in the BEGIN and END variables bracket t1. Adjust to the beginning observation of the form n*m+s where n*m+s<=i<(n+1)*m+s. The data table pointer is then moved k*m observations. A value of k>0 moves the data table pointer k*m observations forward, and k<0 moves the pointer backward. The interval at the resulting location in the data set is the desired interval after incrementing (decrementing).

Given a custom interval data table with MAXOBS observations, let Bi be the value of BEGIN at observation i, and Ei be the value of END at observation i. Then, pseudocode is:

```
// find number of the observation which brackets starting date t1
found = 0
i = 1
while (!EOF and !found) {
    if ( Bi <= t1 and t1 <= Ei) {
        found = 1
        break
    }
    i++
}
// t1 might be outside bounds of this finite interval definition
if (!found) error
// adjust i : defaults are m=1,s=1; restriction 1 <= s <= m
if (m != 1 ) i -= (i-s)mod m;
// move k intervals
i+= k*m;
// t2 might be outside bounds of this finite interval definition
if (i <1 or i > MAXOBS) error
if (alignment = begin)
    t2 = Bi
else
    if (m > 1) i += (m-1)
    t2 = Ei
```

In the example of FIG. 1, if the name of the custom interval is EasterCycle, then the result of INTNX('01JAN2005'D, "EasterCycle6", 2) is '24Apr2006'D.

Determine the Number of Intervals, k, Between Two Dates, t1 and t2:

If t2>t1, k>=0. If t2<t1, k<=0. Here the interval is of the format <custom interval><m>.<s>. (SAS function INTCK) Let the row number of the interval data table in which the BEGIN and END variables bracket t1 be i and calculate 't1obs'=n such that (n-1)*m+s<=i<n*m+s. Likewise, let the observation number in which the same variables bracket the t2 date be i and calculate 't2obs'=n such that (n-1)*m+s<=i<n*m+s. The number of intervals between t1 and t2 is then calculated as (t2obs−t1obs). Consistent with the increment/decrement problem, a negative value may be calculated. Then, pseudocode is:

```
// find number of the observation which brackets starting date t1
found = 0
i = 1
while (!EOF and !found) {
    if ( Bi <= t1 and t1 <= Ei) {
        found = 1
        break
    }
    i++
}
// t1 might be outside bounds of this finite interval definition
if (!found) error
// adjust i : defaults are m=1,s=1; restriction 1 <= s <= m
if (m != 1 ) {
    i -= (i-s)mod m;
    i -= s;
    i /= m;
    i++;
}
t1obs = i;
// find number of the observation which brackets starting date t2
found = 0
i = 1
while (!EOF and !found) {
    if ( Bi <= t2 and t2 <= Ei) {
        found = 1
        break
    }
    i++
}
// t2 might be outside bounds of this finite interval definition
if (!found) error
// adjust i : defaults are m=1,s=1; restriction 1 <= s <= m
if (m != 1 ) {
    i -= (i-s)mod m;
```

```
    i -= s;
    i /= m;
    i++;
}
t2obs = i;
k = t2obs - t1obs;
```

For INTTEST, INTFMT, INSHIFT, <custom interval><m>. <s> inherits properties from <custom interval>. For INTCYCLE, <custom interval><m>. <s> is its own cycle (trivial). For INTSEAS, INTINDEX, INTCINDEX with intervals of the format <custom interval><m>. <s>, the result is trivially 1.

Figure 17:
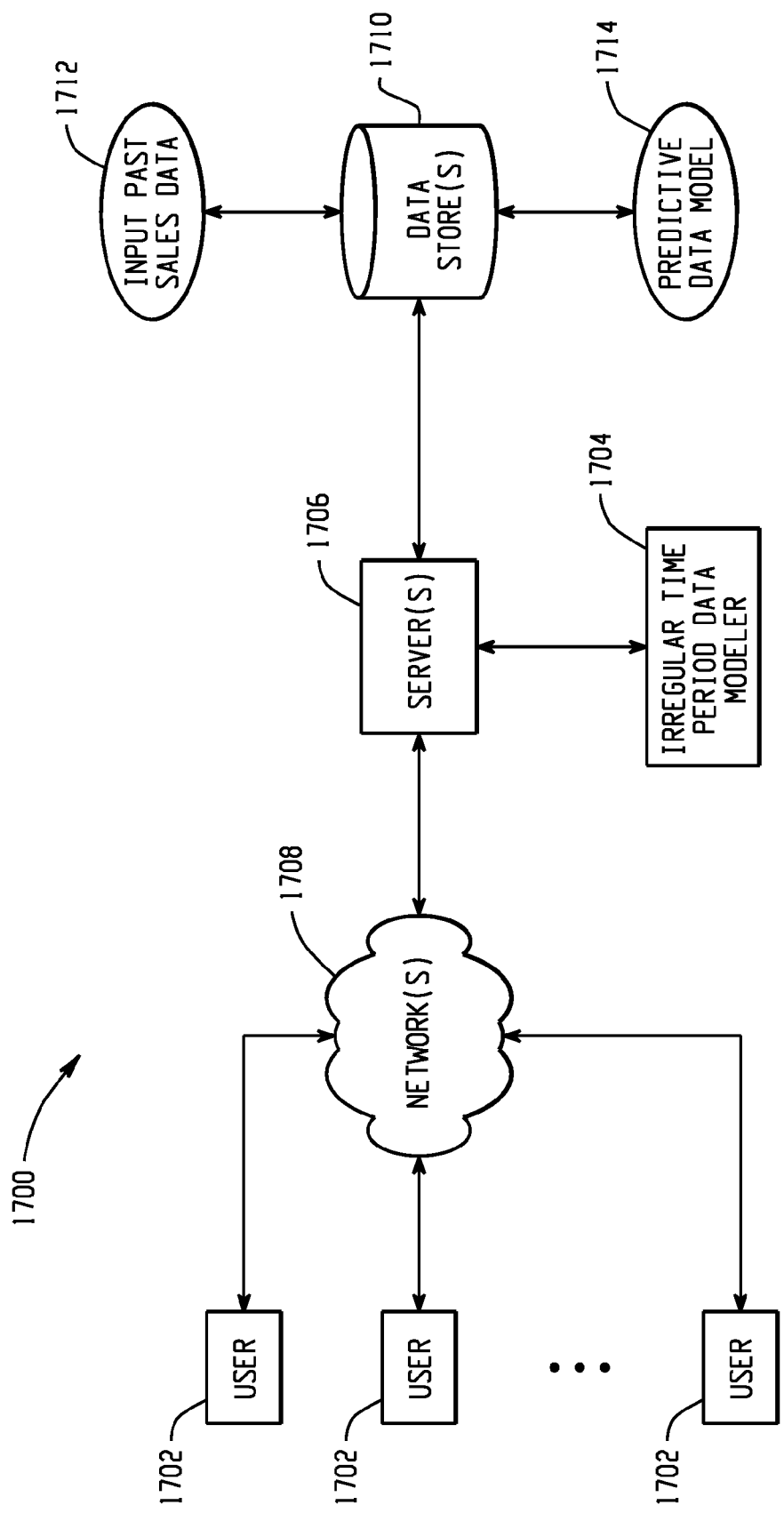
FIG. 17 depicts at a computer-implemented environment wherein users can interact with an irregular time period data modeler hosted on one or more servers through a network.

FIG. 17 depicts at 1700 a computer-implemented environment wherein users 1702 can interact with an irregular time period data modeler 1704 hosted on one or more servers 1706 through a network 1708. The system 1704 contains software operations or routines for generating a future sales forecast for a future time period in a system where at least one converted time period is of irregular length with respect to other time periods. The users 1702 can interact with the system 1704 through a number of ways, such as over one or more networks 1708. One or more servers 1706 accessible through the network(s) 1708 can host the irregular time period data modeler 1704. It should be understood that the irregular time period data modeler 1704 could also be provided on a stand-alone computer for access by a user.

Figure 18A:
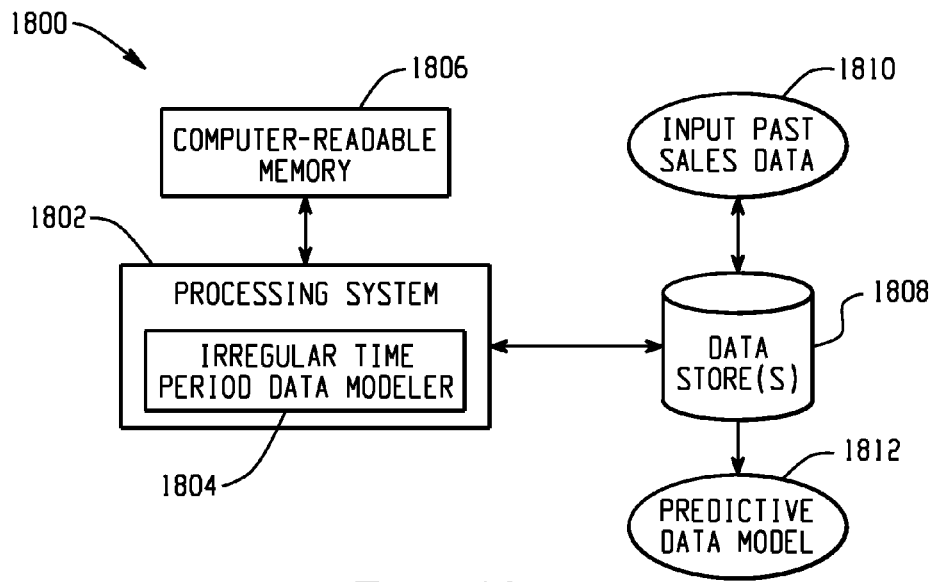
FIGS. 18A, 18B, and 18C depict example systems for use in implementing an irregular time period data modeler.
Figure 18B:
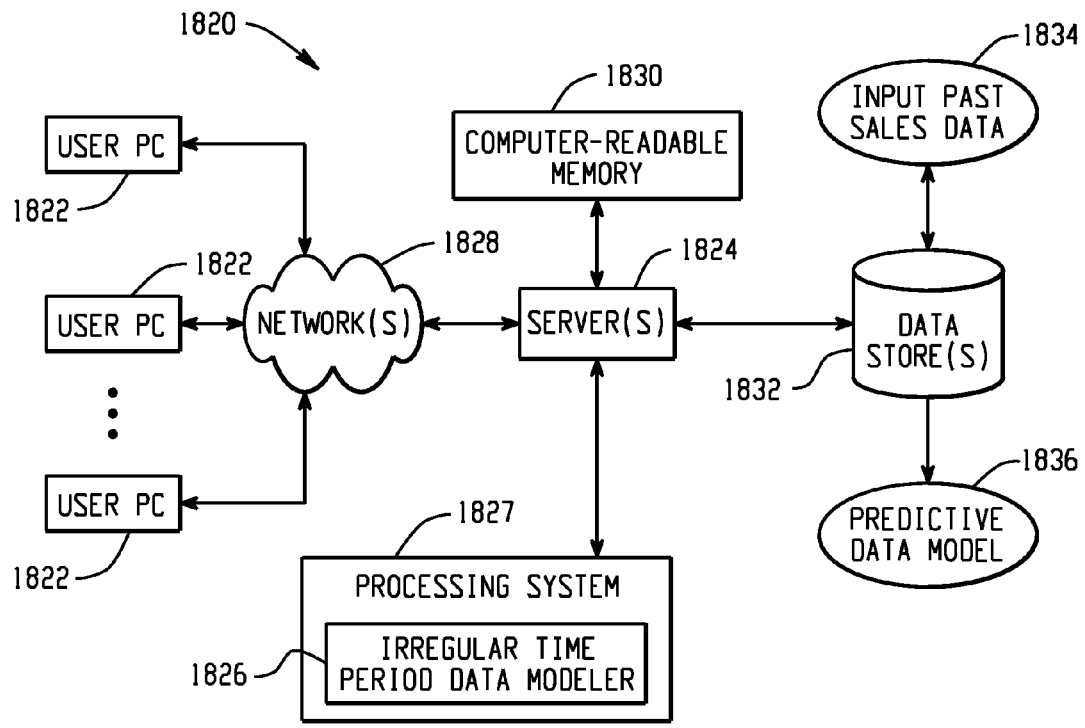
Figure 18C:
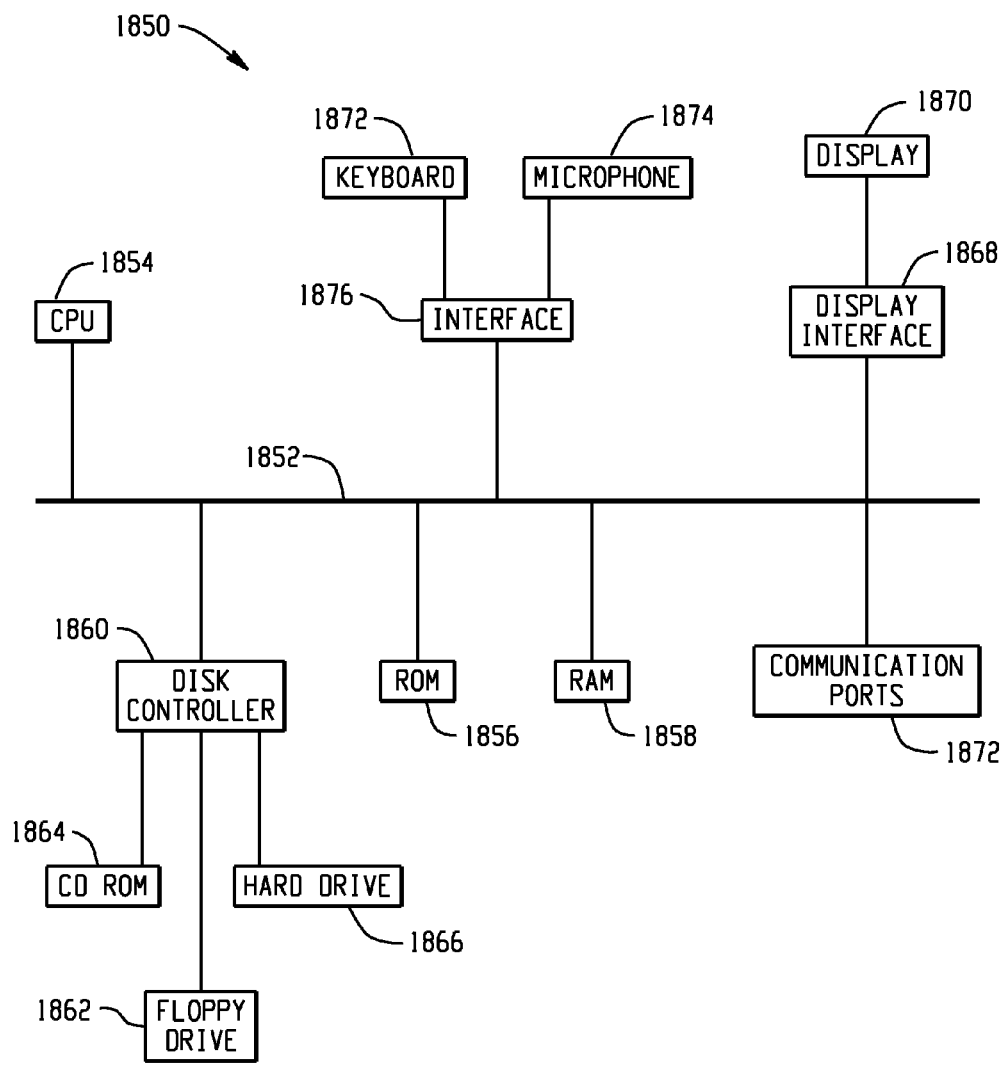

FIGS. 18A, 18B, and 18C depict example systems for use in implementing an irregular time period data modeler. For example, FIG. 18A depicts an exemplary system 1800 that includes a stand alone computer architecture where a processing system 1802 (e.g., one or more computer processors) includes an irregular time period data modeler 1804 being executed on it. The processing system 1802 has access to a computer-readable memory 1806 in addition to one or more data stores 1808. The one or more data stores 1808 may contain input past sales data 1810 as well as predictive data models 1812.

FIG. 18B depicts a system 1820 that includes a client server architecture. One or more user PCs 1822 accesses one or more servers 1824 running an irregular time period data modeler 1826 on a processing system 1827 via one or more networks 1828. The one or more servers 1824 may access a computer readable memory 1830 as well as one or more data stores 1832. The one or more data stores 1832 may contain input past sales data 1834 as well as predictive data models 1836.

FIG. 18C shows a block diagram of exemplary hardware for a standalone computer architecture 1850, such as the architecture depicted in FIG. 18A that may be used to contain and/or implement the program instructions of system embodiments of the present invention. A bus 1852 may serve as the information highway interconnecting the other illustrated components of the hardware. A processing system 1854 labeled CPU (central processing unit) (e.g., one or more computer processors), may perform calculations and logic operations required to execute a program. A processor-readable storage medium, such as read only memory (ROM) 1856 and random access memory (RAM) 1858, may be in communication with the processing system 1854 and may contain one or more programming instructions for performing the method of implementing an irregular time period data modeler. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1860 interfaces one or more optional disk drives to the system bus 1852. These disk drives may be external or internal floppy disk drives such as 1862, external or internal CD-ROM, CD-R, CD-RW or DVD drives such as 1864, or external or internal hard drives 1866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1860, the ROM 1856 and/or the RAM 1858. Preferably, the processor 1854 may access each component as required.

A display interface 1868 may permit information from the bus 1856 to be displayed on a display 1870 in audio, graphic, or alphanumeric format. Communication with external devices may optionally occur using various communication ports 1872.

In addition to the standard computer-type components, the hardware may also include data input devices, such as a keyboard 1872, or other input device 1874, such as a microphone, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
   identifying, on a computing device, two candidate segments, wherein each candidate segment includes a time series data value;
   determining a segment function for an identified candidate segment by determining a statistical fit for time series data values included in a proposed combined segment;
   determining a segment error measure for the identified candidate segment by determining a statistic of fit that is a measure of a quality of fit for a proposed combined segment function to time series data values included in a proposed combined segment;
   evaluating a proposed combined segment, wherein the proposed combined segment includes the two candidate segments, and wherein evaluating includes determining a segment function and a segment error measure for the proposed combined segment;
   determining an error cost to merge the two candidate segments by determining an increase in error between the identified candidate segment and the proposed combined segment, wherein the error cost to merge is a difference between the segment error measure for the identified candidate segment and the segment error measure for the proposed combined segment;
   determining whether to combine the two candidate segments, wherein determining includes using the error cost to merge and a comparison between the increase in error and a predetermined threshold; and
   combining the two candidate segments according to the determination.

2. The method of claim 1, wherein determining whether to combine the two candidate segments further includes determining to combine the two candidate segments when the error cost to merge is above the predetermined threshold.

3. The method of claim 2, wherein determining whether to combine the two candidate segments further includes determining to not combine the two candidate segments when the error cost to merge is below the predetermined threshold.

4. The method of claim 1, wherein determining whether to combine the two candidate segments further includes determining to combine the two candidate segments when the error cost to merge is below the predetermined threshold.

5. The method of claim 4, wherein determining whether to combine the two candidate segments further includes determining to not combine the two candidate segments when the error cost to merge is above the predetermined threshold.

6. The method of claim 1, wherein the proposed combined segment is part of a data set, and wherein combining the two candidate segments includes altering the data set by replacing the two candidate segments with the proposed combined segment.

7. The method of claim 6, wherein altering the data set increases a stationarity of the data set.

8. The method of claim 6, wherein the data set includes data corresponding to unique days, and wherein the two candidate segments include one or more days which are weekends or holidays.

9. The method of claim 1, wherein the method is used to generate an irregular time period data model.

10. The method of claim 9, wherein the data model is a predictive data model, and wherein a sales forecast is generated for a future time using the predictive data model.

11. The method of claim 6, further comprising:
    using the data set in calculations associated with an accounting system which includes non-standard accounting periods.

12. The method of claim 1, wherein the segment error measure for the proposed combined segment is a statistic of fit, and wherein the statistic of fit measures a quality of fit of the proposed combined segment function to time series data values included in the proposed combined segment.

13. The method of claim 1, further comprising:
    determining an error cost to merge for an additional two candidate segments; and
    ranking the candidate segments, wherein ranking includes comparing the error cost to merge the two candidate segments and the error cost to merge the additional two candidate segments.

14. The method of claim 13, wherein the additional two candidate segments are ranked lower than the two candidate segments, and wherein a determination to combine the additional two candidate segments is made after the determination whether to combine the two candidate segments.

15. The method of claim 1, wherein the included data values are part of a data set characterized by seasonal variation in the data of the set.

16. The method of claim 15, wherein the included data values correspond to a same season.

17. The method of claim 16, wherein the data set characterized by seasonal variation includes data related to an amount of business activity, and wherein the same season coincides with a trough in the amount of business activity.

18. The method of claim 1, further comprising:
    calculating a percentage increase in cost.

19. The method of claim 1, wherein determining the error cost to merge includes determining a percentage increase in error between the identified candidate segment and the proposed combined segment.

20. The method of claim 19, wherein determining whether to combine the two candidate segments further includes comparing the percentage increase in error to the predetermined threshold.

21. The method of claim 20, wherein determining the percentage increase includes performing a division operation, the division operation including a divisor equal to a constant term of the segment function for the identified candidate segment.

22. A system, comprising:
    one or more data processors; and
    one or more non transitory computer-readable storage media containing instructions configured to cause the one or more processors to perform operations including:
    identifying two candidate segments, wherein each candidate segment includes a time series data value;

determining a segment function for an identified candidate segment by determining a statistical fit for time series data values included in a proposed combined segment;

determining a segment error measure for the identified candidate segment by determining a statistic of fit that is a measure of a quality of fit for a proposed combined segment function to time series data values included in a proposed combined segment;

evaluating a proposed combined segment, wherein the proposed combined segment includes the two candidate segments, and wherein evaluating includes determining a segment function and a segment error measure for the proposed combined segment;

determining an error cost to merge the two candidate segments by determining an increase in error between the identified candidate segment and the proposed combined segment, wherein the error cost to merge is a difference between the segment error measure for the identified candidate segment and the segment error measure for the proposed combined segment;

determining whether to combine the two candidate segments, wherein determining includes using the error cost to merge and a comparison between the increase in error and a predetermined threshold; and combining the two candidate segments according to the determination.

23. The system of claim 22, wherein determining whether to combine the two candidate segments further includes determining to combine the two candidate segments when the error cost to merge is above the predetermined threshold.

24. The system of claim 23, wherein determining whether to combine the two candidate segments further includes determining to not combine the two candidate segments when the error cost to merge is below the predetermined threshold.

25. The system of claim 22, wherein determining whether to combine the two candidate segments further includes determining to combine the two candidate segments when the error cost to merge is below the predetermined threshold.

26. The system of claim 25, wherein determining whether to combine the two candidate segments further includes determining to not combine the two candidate segments when the error cost to merge is above the predetermined threshold.

27. The system of claim 22, wherein the proposed combined segment is part of a data set, and wherein combining the two candidate segments includes altering the data set by replacing the two candidate segments with the proposed combined segment.

28. The system of claim 27, wherein altering the data set increases a stationarity of the data set.

29. The system of claim 28, wherein the data set includes data corresponding to unique days, and wherein the two candidate segments include one or more days which are weekends or holidays.

30. The system of claim 27, wherein the operations further include:
using the data set in calculations associated with an accounting system which includes non-standard accounting periods.

31. The system of claim 22, wherein the system is used to generate an irregular time period data model.

32. The system of claim 31, wherein the data model is a predictive data model, and wherein a sales forecast is generated for a future time using the predictive data model.

33. The system of claim 22, wherein the segment error measure for the proposed combined segment is a statistic of fit, and wherein the statistic of fit measures a quality of fit of the proposed combined segment function to time series data values included in the proposed combined segment.

34. The system of claim 22, wherein the operations further include:
determining an error cost to merge for an additional two candidate segments; and
ranking the candidate segments, wherein ranking includes comparing the error cost to merge the two candidate segments and the error cost to merge the additional two candidate segments.

35. The system of claim 34, wherein the additional two candidate segments are ranked lower than the two candidate segments, and wherein a determination to combine the additional two candidate segments is made after the determination whether to combine the two candidate segments.

36. The system of claim 22, wherein the included data values are part of a data set characterized by seasonal variation in the data of the set.

37. The system of claim 36, wherein the included data values correspond to a same season.

38. The system of claim 37, wherein the data set characterized by seasonal variation includes data related to an amount of business activity, and wherein the same season coincides with a trough in the amount of business activity.

39. The system of claim 22, wherein the operations further comprise:
calculating a percentage increase in cost.

40. The system of claim 22, wherein determining the error cost to merge includes determining a percentage increase in error between the identified candidate segment and the proposed combined segment.

41. The system of claim 40, wherein determining whether to combine the two candidate segments further includes comparing the percentage increase in error to the predetermined threshold.

42. The system of claim 41, wherein determining the percentage increase includes performing a division operation, the division operation including a divisor equal to a constant term of the segment function for the identified candidate segment.

43. A computer-program product tangibly embodied in a non-transitory machine readable storage medium, the computer-program product including instructions configured to cause a data processing apparatus to:
identify two candidate segments, wherein each candidate segment includes a time series data value;
determine a segment function for an identified candidate segment by determining a statistical fit for time series data values included in a proposed combined segment;
determine a segment error measure for the identified candidate segment by determining a statistic of fit that is a measure of a quality of fit for a proposed combined segment function to time series data values included in a proposed combined segment;
evaluate a proposed combined segment, wherein the proposed combined segment includes the two candidate segments, and wherein evaluating includes determining a segment function and a segment error measure for the proposed combined segment;
determine an error cost to merge the two candidate segments by determining an increase in error between the identified candidate segment and the proposed combined segment, wherein the error cost to merge is a difference between the segment error measure for the identified candidate segment and the segment error measure for the proposed combined segment;

determine whether to combine the two candidate segments, wherein determining includes using the error cost to merge and a comparison between the increase in error and a predetermined threshold; and
combine the two candidate segments according to the determination.

44. The computer-program product of claim 43, wherein determining whether to combine the two candidate segments further includes determining to combine the two candidate segments when the error cost to merge is above the predetermined threshold.

45. The computer-program product of claim 44, wherein determining to not combine the two candidate segments further includes determining to not combine the two candidate segments when the error cost to merge is below the predetermined threshold.

46. The computer-program product of claim 43, wherein determining whether to combine the two candidate segments further includes determining to combine the two candidate segments when the error cost to merge is below the predetermined threshold.

47. The computer-program product of claim 46, wherein determining whether to combine the two candidate segments further includes determining to not combine the two candidate segments when the error cost to merge is above the predetermined threshold.

48. The computer-program product of claim 43, wherein the proposed combined segment is part of a data set, and wherein combining the two candidate segments includes altering the data set by replacing the two candidate segments with the proposed combined segment.

49. The computer-program product of claim 48, wherein altering the data set increases a stationarity of the data set.

50. The computer-program product of claim 49, wherein the data set includes data corresponding to unique days, and wherein the two candidate segments include one or more days which are weekends or holidays.

51. The computer-program product of claim 48, further including instructions configured to cause a data processing apparatus to:
use the data set in calculations associated with an accounting system which includes non-standard accounting periods.

52. The computer-program product of claim 43, wherein the computer-program product is used to generate an irregular time period data model.

53. The computer-program product of claim 52, wherein the data model is a predictive data model, and wherein a sales forecast is generated for a future time using the predictive data model.

54. The computer-program product of claim 43, wherein each of the two identified candidate segments includes multiple time series data values, and wherein calculating the segment function for an identified candidate segment includes determining a statistical fit of the multiple time series data values included in the identified candidate segment.

55. The computer-program product of claim 43, further including instructions configured to cause a data processing apparatus to:
determine an error cost to merge for an additional two candidate segments; and
rank the candidate segments, wherein ranking includes comparing the error cost to merge the two candidate segments and the error cost to merge the additional two candidate segments.

56. The computer-program product of claim 55, wherein the additional two candidate segments are ranked lower than the two candidate segments, and wherein the determination to combine the additional two candidate segments is made after the determination whether to combine the two candidate segments.

57. The computer-program product of claim 43, wherein the included data values are part of a data set characterized by seasonal variation in the data of the set.

58. The computer-program product of claim 57, wherein the included data values correspond to a same season.

59. The computer-program product of claim 58, wherein the data set characterized by seasonal variation includes data related to an amount of business activity, and wherein the same season coincides with a trough in the amount of business activity.

60. The computer-program product of claim 43, wherein the computer-program product further includes instructions configured to cause the data processing apparatus to calculate a percentage increase in cost.

61. The computer-program product of claim 43, wherein determining the error cost to merge includes determining a percentage increase in error between the identified candidate segment and the proposed combined segment.

62. The computer-program product of claim 61, wherein determining whether to combine the two candidate segments further includes comparing the percentage increase in error to the predetermined threshold.

63. The computer-program product of claim 62, wherein determining the percentage increase includes performing a division operation, the division operation including a divisor equal to a constant term of the segment function for the identified candidate segment.

* * * * *